United States Patent [19]

Firey

[11] Patent Number: 4,584,970

[45] Date of Patent: * Apr. 29, 1986

[54] CYCLIC SOLID GAS REACTOR

[76] Inventor: Joseph C. Firey, P.O. Box 15514, Seattle, Wash. 98115-0514

[*] Notice: The portion of the term of this patent subsequent to Nov. 1, 2000 has been disclaimed.

[21] Appl. No.: 473,566

[22] Filed: Mar. 9, 1983

[51] Int. Cl.⁴ .................. F02B 45/02; F02D 19/04
[52] U.S. Cl. ................... 123/23; 123/1 R; 60/39.52
[58] Field of Search .............. 123/1 R, 23, 3, 24, 123/64; 60/39.52

[56] References Cited

U.S. PATENT DOCUMENTS

| | | | |
|---|---|---|---|
| 974,087 | 10/1910 | Low | 123/23 |
| 1,586,508 | 5/1926 | Brutzkus | 123/64 |
| 2,172,124 | 9/1939 | Gilbert | 123/24 |
| 2,396,524 | 3/1946 | Nettle | 123/23 |
| 2,625,141 | 1/1953 | Berlyn | 123/23 |
| 3,981,277 | 9/1976 | Abom | 123/23 |
| 4,059,078 | 11/1977 | de la Rosa | 123/25 K |
| 4,204,506 | 5/1980 | Bowing | 123/23 |
| 4,412,511 | 11/1983 | Firey | 123/23 |

Primary Examiner—Carl Stuart Miller

[57] ABSTRACT

A cyclic solid to gas reactor is described capable of reacting several different gas reactants in sequence with one or more solid reactants. The solid reactant in a reaction chamber is subjected to repeated cycles of compression and expansion with the reactant gas by a compressor means enclosing the reaction chamber. Useful mechanical work can be generated from the heat of reaction.

28 Claims, 18 Drawing Figures

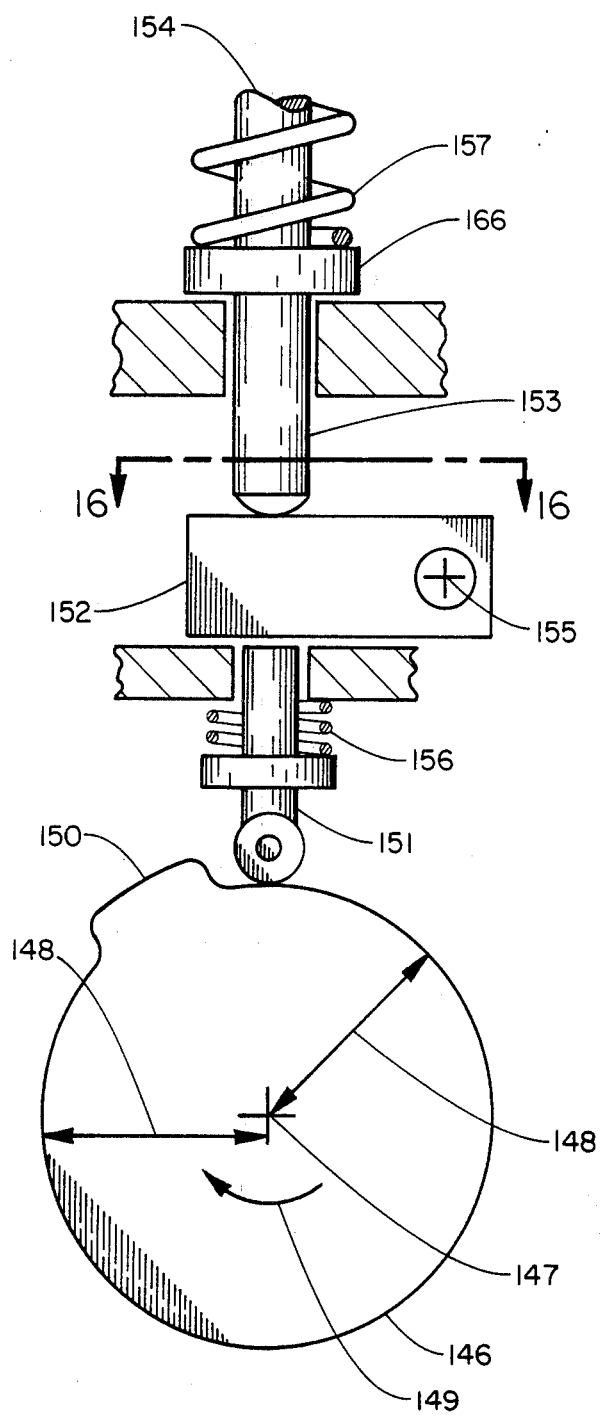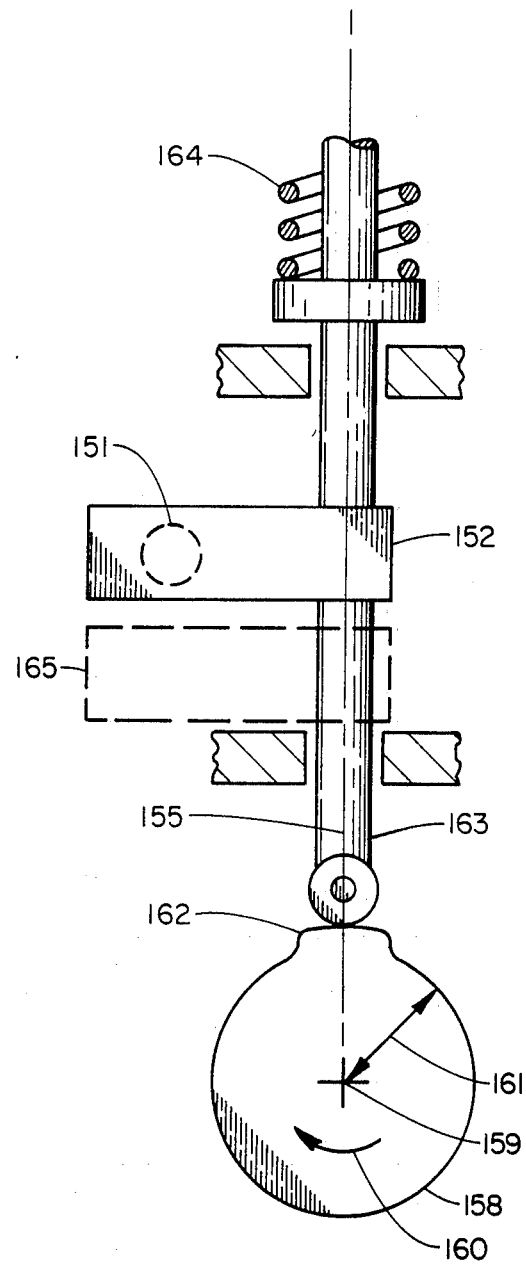
FIGURE 14
FIGURE 15

CYCLIC SOLID GAS REACTOR

CROSS REFERENCES TO RELATED APPLICATIONS

This application is related to my following U.S. patent applications:
1. "Further Improved Char and Oil Burning Engine," Ser. No. 367019, filing date Apr. 9, 1982, now issued as U.S. Pat. No. 4,412,511, on Nov. 1, 1983.
2. "Improved Cyclic Char Gasifier," Ser. No. 328148, filing date Dec. 7, 1981, now abandoned.
3. "Torque Leveller," Ser. No. 403923, filing date Aug. 30, 1982, now issued as U.S. Pat. No. 4,433,547, on Feb. 28, 1984.
4. "Char Burning Free Piston Gas Generator," Ser. No. 264105, filing date May 14, 1981, now allowed and base issue fee paid now issued as U.S. Pat. No. 4,372,256, on Feb. 8, 1983.
5. "Cyclic Catalytic Reactor," Ser. No. 214443, filing date Dec. 8, 1980, now abandoned.
6. "Multipressure Compressor," Ser. No. 411913, filing date Aug. 26, 1982, now issued as U.S. Pat. No. 4,480,654, on Nov. 6, 1984.
7. "Engine Steam Stratifier," Ser. No. 148401, filing date May 9, 1980, now issued as U.S. Pat. No. 4,333,423 on June 8, 1982.

OTHER REFERENCES

The following references may be relevant in the examination of this application as they were cited during examination of some of the cross-referenced applications.
A. U.S. Pat. Nos.: 974087, 4204506, 3981277, 2714670, 4047901, 1913395, 1992323, 3734184, 4085578, 2675672, 2225311, 2624172, 4011839, 3923011, 2632296, 4333423, 4004421, 2396524, 2425850, 3149617, 3370576, 3981277.
B. Great Britain Pat. Nos.: 11475, 492831.
C. Canada Pat. Nos.: 651973.

BACKGROUND OF THE INVENTION

1. Field of the Invention

This invention is in the field of chemical reactor machines for reacting one or more solid reactants with one or more gaseous reactants.

2. Description of the Prior Art

Prior art chemical reactor machines for reacting solid reactants with gaseous reactants are operated at essentially steady and usually low pressures with the results that useful work output cannot be generated directly and continuously from any heat of the gas to solid reaction and the reactions are slow since essentially only the external surface area of the solid particles is utilized for carrying on the reaction. Additionally, prior art solid to gas reactor machines mix the solid reactants together, where two or more solid reactants are used, so that reaction may occur between the solid reactants and produce undesired results.

To produce mechanical work directly and continuously from a gas to solid chemical reaction requires use of a work cycle or a work process wherein high gas pressures prevail during a portion of the cycle or process and low gas pressures prevail during another portion of the cycle or process. The work quantity generated per unit of chemical reaction increases generally with increasing differences between the high pressures and the low pressures. Hence, steady pressure reaction processes, as now used for gas to solid reactions, cannot produce continuous work output directly from the reaction process and this is a deficiency of prior art steady pressure solid to gas chemical reactor machines.

Gas to solid chemical reactions necessarily take place upon the solid surface and the rate of reaction is proportional to the area of solid exposed to gas and also the concentration of gas reactant adjacent to that area. Product gases formed from the solid to gas reaction tend to remain adjacent the solid area from which they were formed and thus act to "blanket" the solid area by reducing the concentration of gas reactant adjacent that area. In this way the product gas blanket acts to slow down the solid to gas reaction. This product blanket retardation is especially strong inside dead-end pore spaced of a solid reactant at steady pressures since the product blanket gases can only be removed by slow diffusion out through the long pore passage and fresh gas reactant can reach these interior pore surface areas only by slow counter diffusion through the same long pore passage. Hence, for steady pressure reactors the interior pore spaces of a solid reactant are poorly utilized for carrying on reaction with a gas reactant and the principal reaction occurs only on the external surface area of the solid where the diffusion paths for product blanket removal and fresh gas reactant replacement are short. It is a common practice in prior art, steady pressure, solid to gas reactors to further shorten these external solid area diffusion path lengths by forcing the gas reactant through the solid reactant flow passages at high velocity to thin down the stagnant gas boundary layer on these areas. But such high velocity flow produces a pressure loss requiring a work input to sustain the process. These are additional deficiencies of prior art steady pressure solid to gas reactors, that the dead end pore spaces are little used for carrying on the reaction, and a work input is usually needed to achieve reasonable reaction rates on the external solid areas being actually utilized.

Some solid reactants have little or no dead-end pore spaces but many solid reactants, particularly naturally occurring minerals such as coal and metal ores, have internal pore spaces. Commonly the solid area within these interior pore spaces is many fold greater than the external surface area of the solid reactant. A reactor capable of efficiently using both the external area and the interior pore area of a solid reactant could carry out solid to gas reactions much faster than prior art steady pressure reactors.

Where two or more solid reactants are to react jointly with one or more gas reactants in a steady pressure reactor, it is usually necessary to premix the solid reactants in order that they be in close proximity to one another so that the joint reaction with the gases can take place. In a blast furnace, for example, air is reacted jointly with coke and iron ore, the oxygen reacting with coke to form carbon monoxide, the carbon monoxide reacting with iron ore to form iron and carbon dioxide, and the carbon dioxide, in turn, reacting with coke to return to carbon monoxide again. The coke and iron ore must be reasonably close together if this process is to be carried out. But inevitably the iron product also reacts with the adjacent coke to form iron carbides and dissolved carbon and this carbon must then be later removed from the pig iron product of the blast furnace in another separate reactor in order to produce a final steel product. A solid to gas reactor wherein two or more solid reactants can be kept separated and yet can react jointly with one or more gas reactants would permit carrying out these reactions without incurring such undesirable solid to solid reactions.

In prior art steady pressure solid to gas reactors the gas is passed but one over the solid and thus either poor utilization of the gas reactant results or else the solid reactant must be in a deep bed requiring appreciable work input to force the gas therethrough. This is an additional deficiency of prior art solid to gas reactors.

The term solid reactant is used herein and in the claims to include wholly solid materials as well as solids whose surface is wetted with a liquid. A single separate solid reactant can be but a single chemical or a mixture of several chemicals. Separate solid reactants are materials kept mechanically separated and not mixed together. Solid reactants are delivered into a reactor.

The term gas reactor is used herein and in the claims to include single gaseous chemicals as well as mixtures of several different gaseous chemicals. Separate gas reactants are gases kept mechanically separated and not mixed together. A gas reactant may be chemically unreactive or inert with a solid reactant as, for example, a purge gas used to remove a previously used gas which was reactive with the solid reactant. Gas reactants are delivered into a reactor.

The term product gas is used herein and in the claims to include single gases or mixtures of gases. Separate product gases are gases kept mechanically separated and not mixed together. Gas products are discharged out of a reactor.

The term non gas product is used herein and in the claims to include solids, liquids and mixtures of solids and liquids. Separate non gas products are kept mechanically separated and are not mixed together. Non gas products are discharged out of a reactor.

The term compressor means is used herein and in the claims to mean a combination comprising a positive displacement compressor expander element, a delivery means for delivering gases into the compressor expander element from a reactant gas inlet pipe, and a power means to drive the compressor expander element and to absorb any work output of the compressor expander element. The compressor expander element can be any of the positive displacement types well known in the prior art as, for example, the following:
  a. piston and cylinder compressor expander units with connecting rods and crankshafts;
  b. piston and cylinder compressor expander units of the free piston type;
  c. rotary compressor expander units such as the type used in the Wankel engine.

The delivery means can be any of the delivery valves in common use on prior art positive displacement compressor expander units such as mechanically driven valves, hydraulically driven valves, pneumatically driven valves, electrically driven valves, etc. A delivery means opens for reactant gas delivery only during a delivery process and is sealed by a sealing means at other times. The power means can be any of the various drive means and power absorbing means already well known in the prior art as, for example, the following:
  a. Alternating current induction motor-generator units;
  b. air motor-compressor units;
  c. hydraulic motor-pump units.

The power means can be a single unit or at least two units, one for driving and one for power absorbing. In most cases, the compressor means will additionally comprise a discharge means for discharging gases from the compressor expander element into a product gas output pipe. The discharge means can be similar to the above-described delivery means except arranged for discharge. A discharge means opens for product gas discharge only during a discharge process and is sealed by a sealing means at other times. A positive displacement compressor expander compresses or discharges during volume decreasing motions of the mechanism and expands or delivers during volume increasing motions of the mechanism. A single compressor means comprises but a single compressor expander element. A reactor plant may comprise several compressor means and hence several compressor expander elements and, if desired, these several compressor means can be mechanically connected together and to but a single power means.

The term piston and cylinder is used herein to mean these elements as commonly used in piston and cylinder compressor expander units and the functionally equivalent portions of other types of compressor expander units.

SUMMARY OF THE INVENTION

The cyclic solid gas reactors of this invention comprise a positive displacement compressor within which a reaction chamber containing solid reactant is positioned so that reactant gases are forced into the pores of the solid reactant during compression and flow out of these pores during expansion. These cycles of gas compression and expansion may be repeated through a sequence of several cycles before replacing the reactant gas mass with fresh reactant gas via a compressor discharge process and a delivery process. Different reactant gases can be utilized during different sequences of cycles. Different resulting product gases can be kept separated after discharge from the compressor. Additional reactant gas can be admitted separately into the compressor during compression to be also forced into the solid reactant pore spaces. Rapid reaction of the solid reactant with the gas reactants occurs since the very large area inside the pores of the solid reactant is fully utilized for reaction. Product gases formed inside the pores do not appreciably blanket the solid surfaces since they are removed therefrom during each expansion. Fresh solid reactant is replaced inside the reaction chamber and reacted non gas products are removed therefrom at intervals.

Useful work can be generated from exothermic reactions since cycles of compression and expansion are used to carry on the reaction. These, then, are the principal beneficial objects of this invention:
  1. solid to gas reactions occur rapidly over the large internal pore area from which blanketing gas products are repeatedly removed;
  2. solids can be reacted in sequence with several different gas reactants separately;
  3. solids can be reacted concurrently with two different gas reactants;
  4. mechanical work can be generated from the heat of reaction of these solid to gas reactions.

By use of two or more separate reaction chambers positioned concentrically, two or more solid reactants can be reacted with several gas reactants and can also react with each other via the gas reactants. In this way, undesirable direct solid to solid reactions can be avoided.

Figure 3:
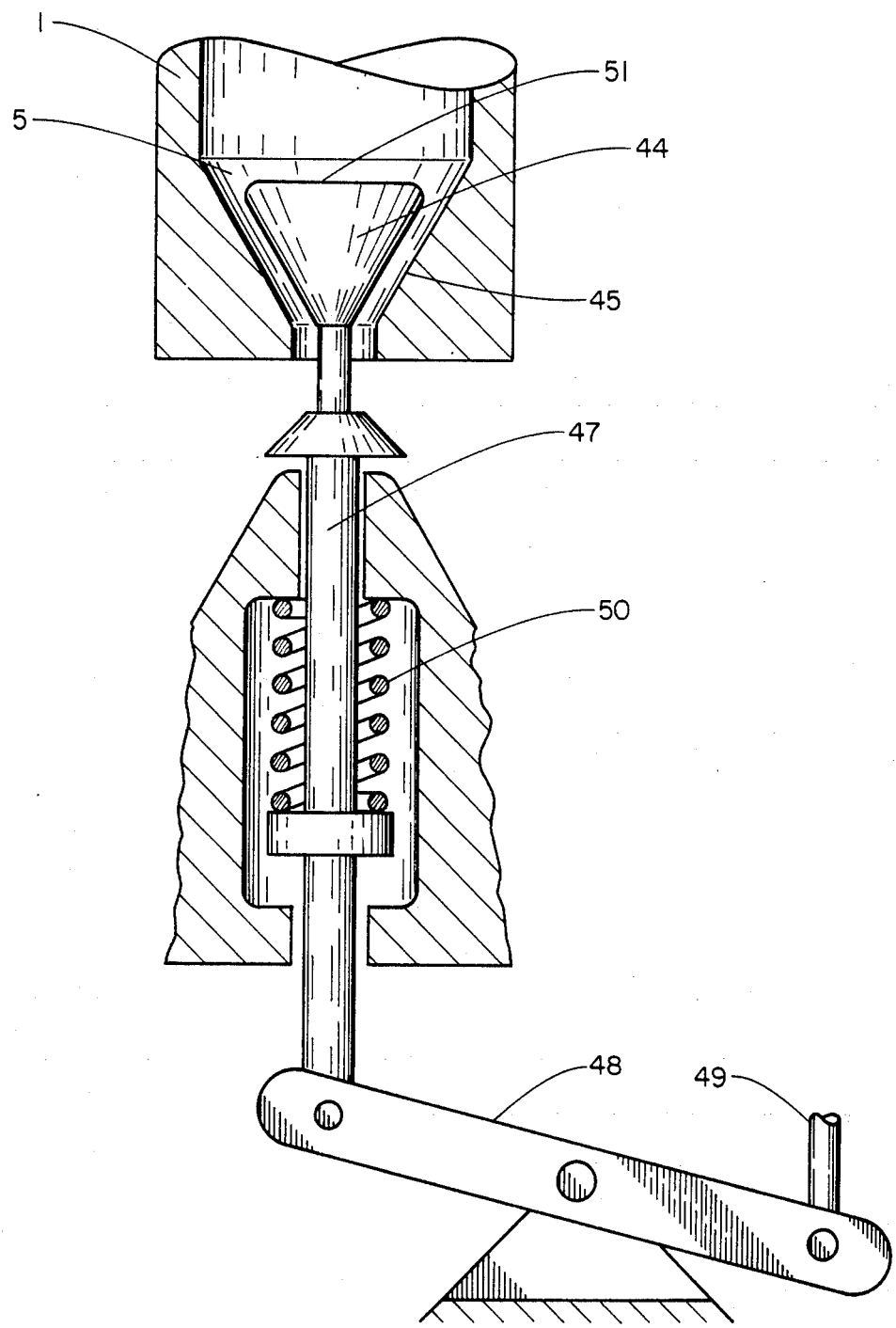

An example liquid product removal means is shown in cross section in FIG. 3 for removal of liquid product from the removal end, 5, of the reaction chamber, 1.

Figure 4:
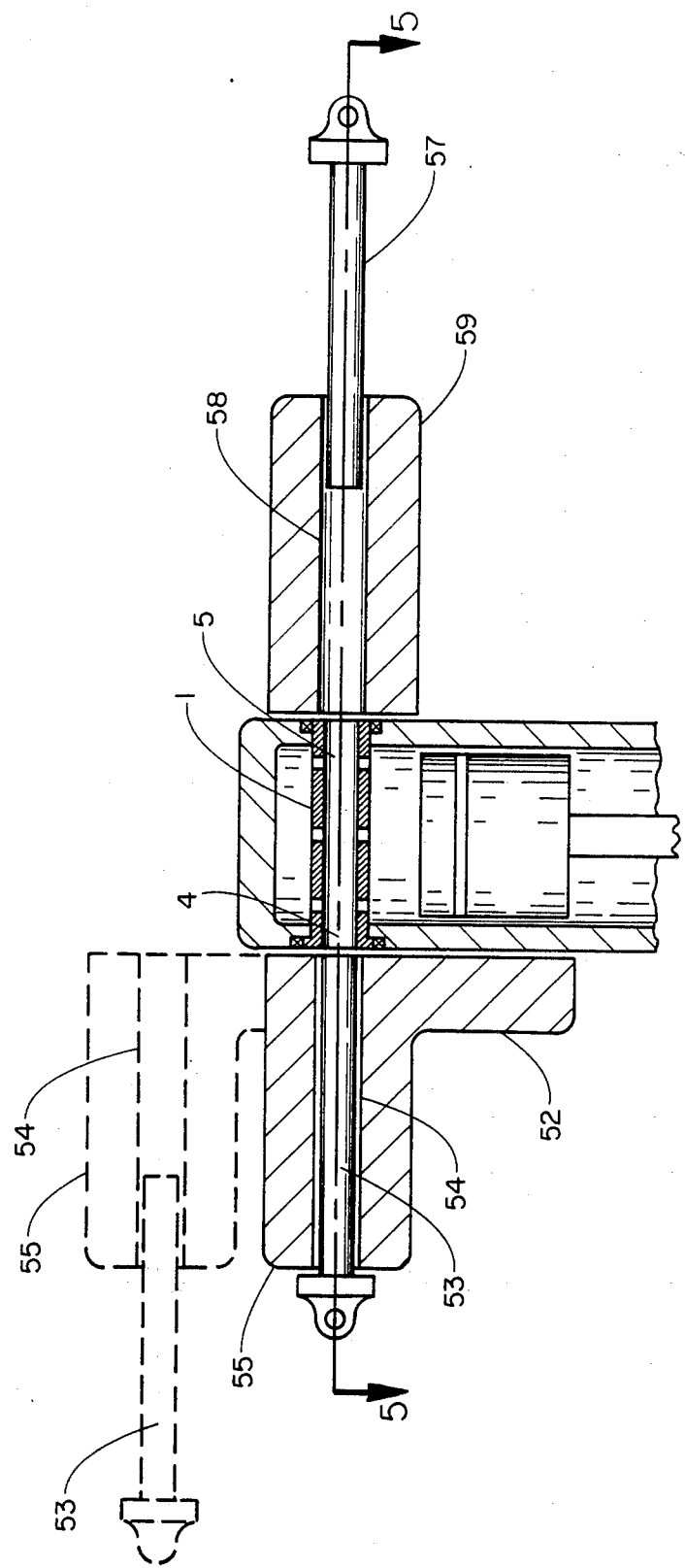
Figure 5:
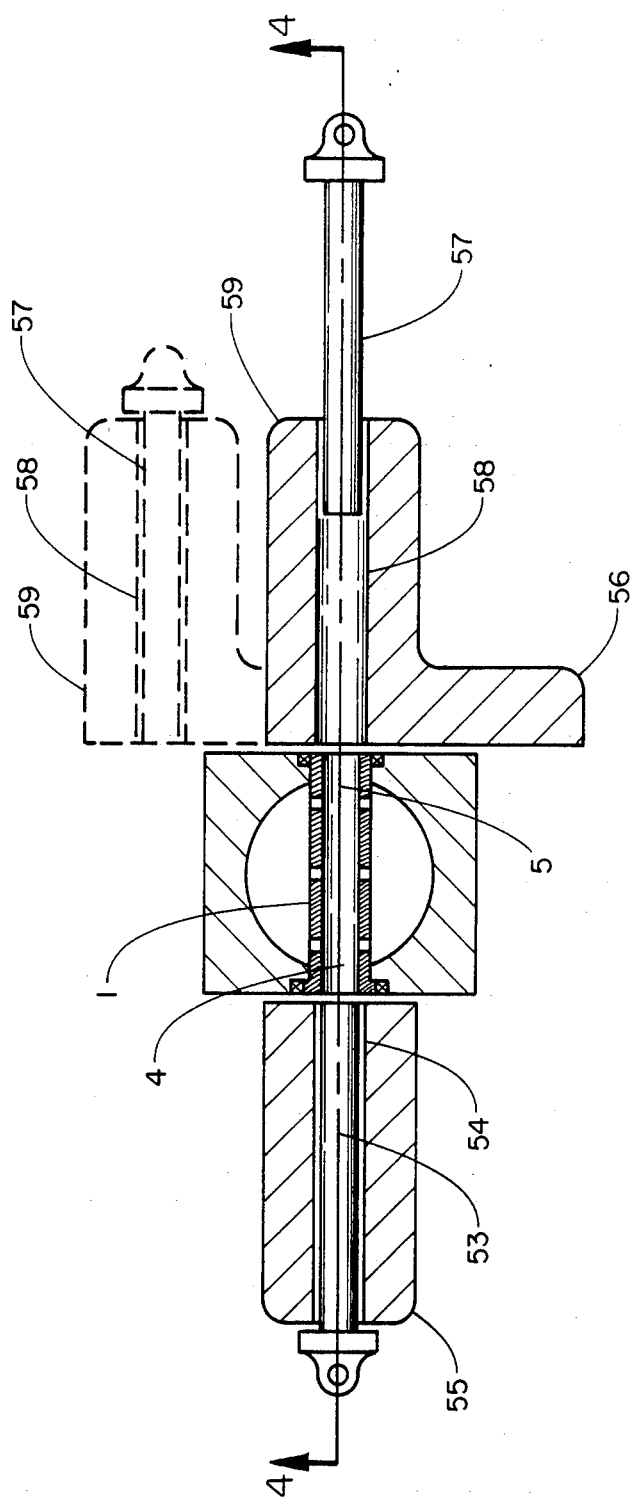

An example refill means, 55, and removal means, 59, are shown in two cross-sectional views in FIG. 4 and FIG. 5 as suitable for complete removal and refill of the reaction chamber, 1.

Figure 6:
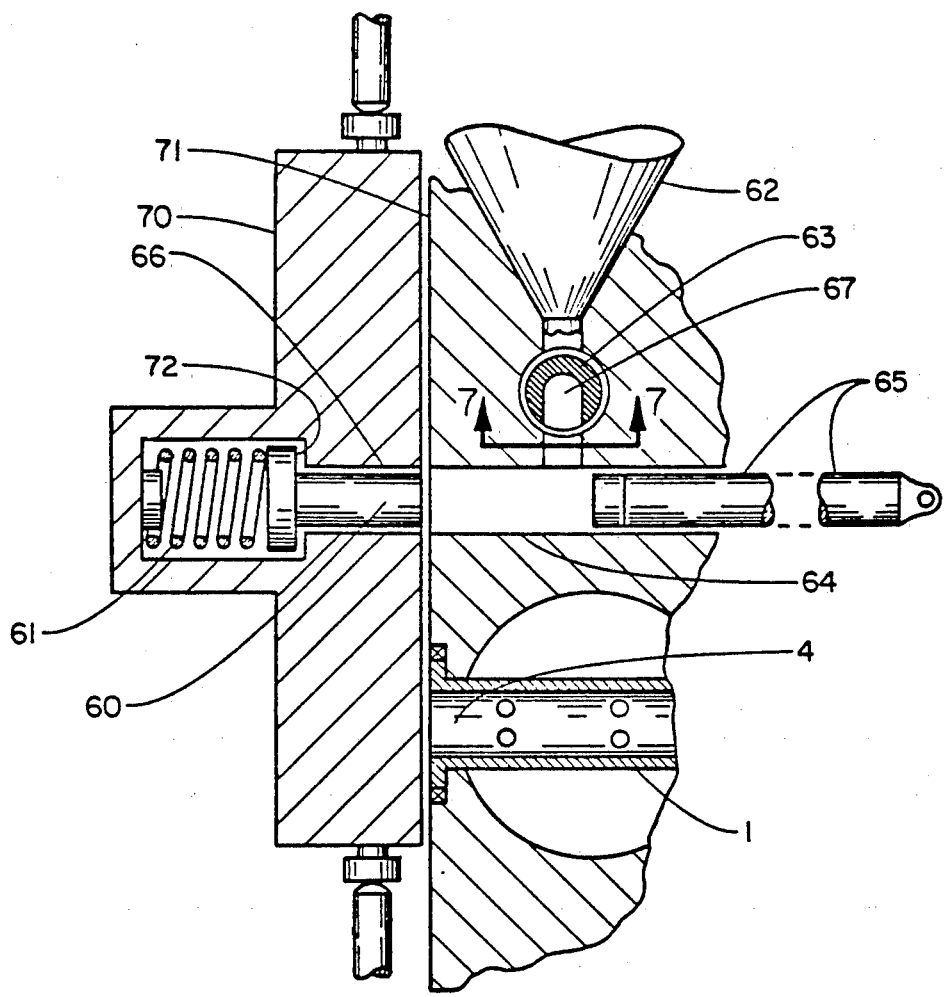
Figure 7:
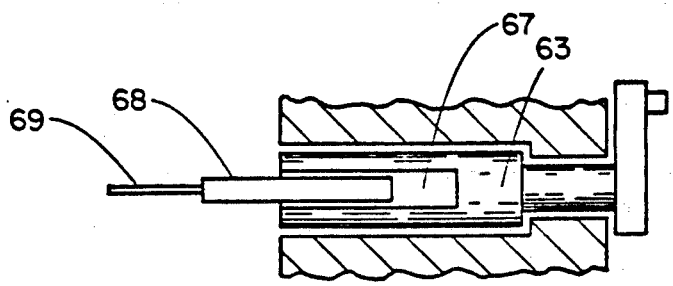

An example refill and reload means are shown in cross section in FIG. 6 and FIG. 7 which controls refill quantity by control of reload quantity.

Figure 8:
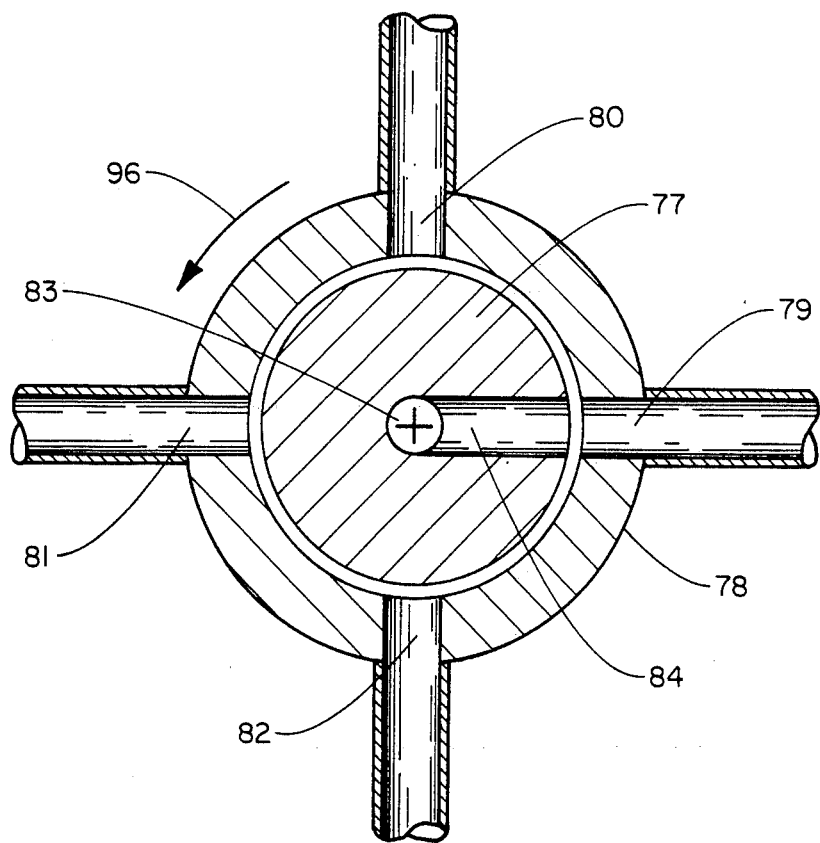
Figure 9:
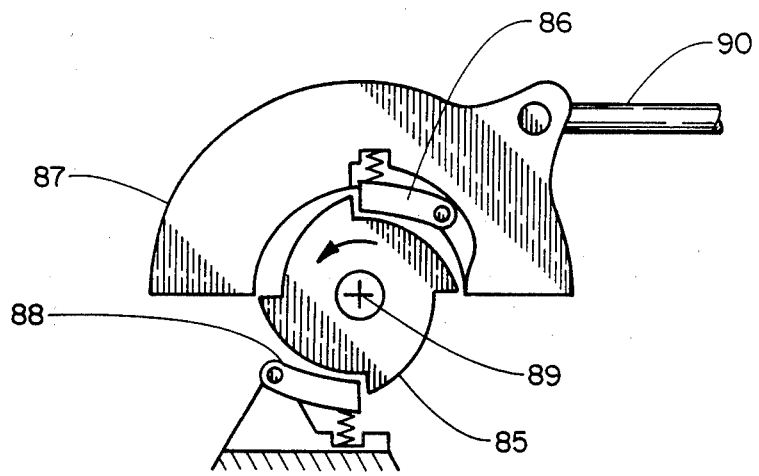
Figure 10:
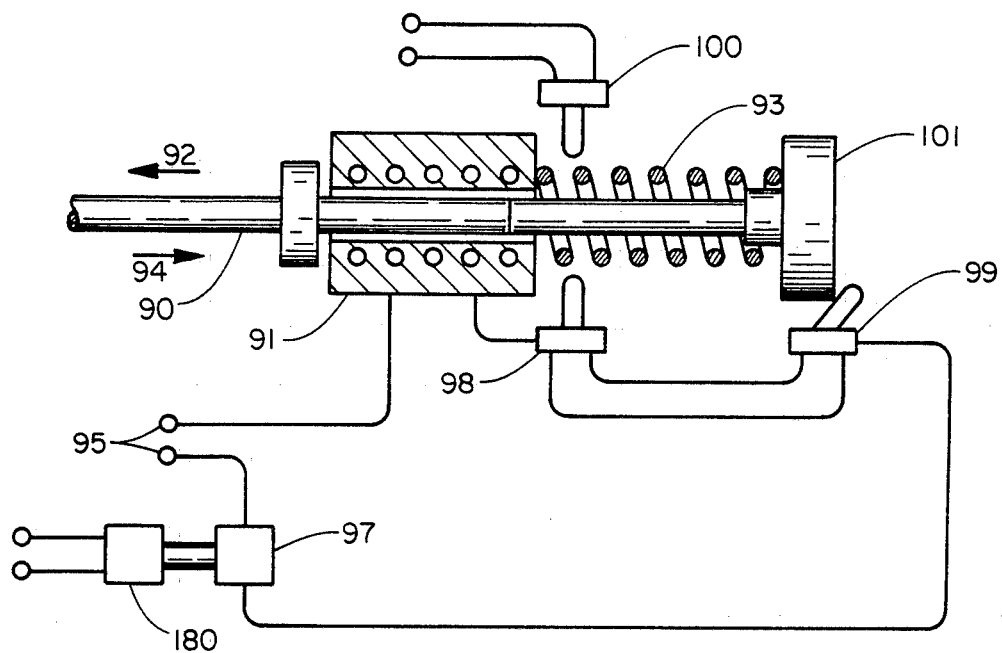
Figure 11:
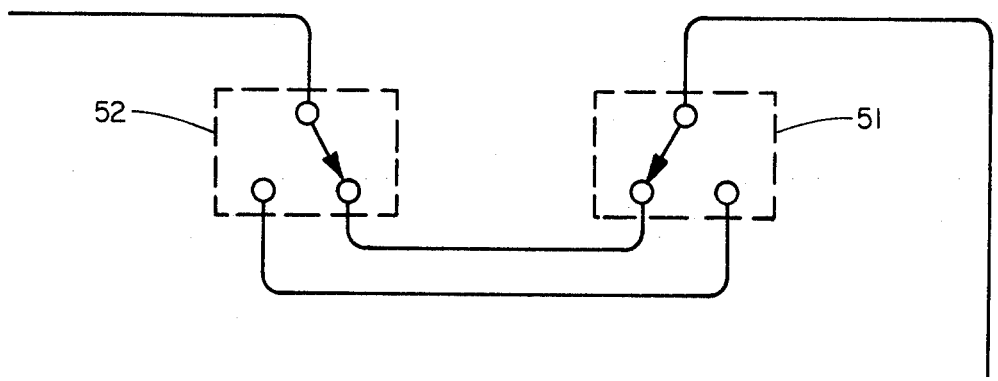

A group selector valve for changing the first reactant gas is shown in FIG. 8 and a drive means for driving this selector valve is shown in FIG. 9, FIG. 10, and FIG. 11.

Figure 12:
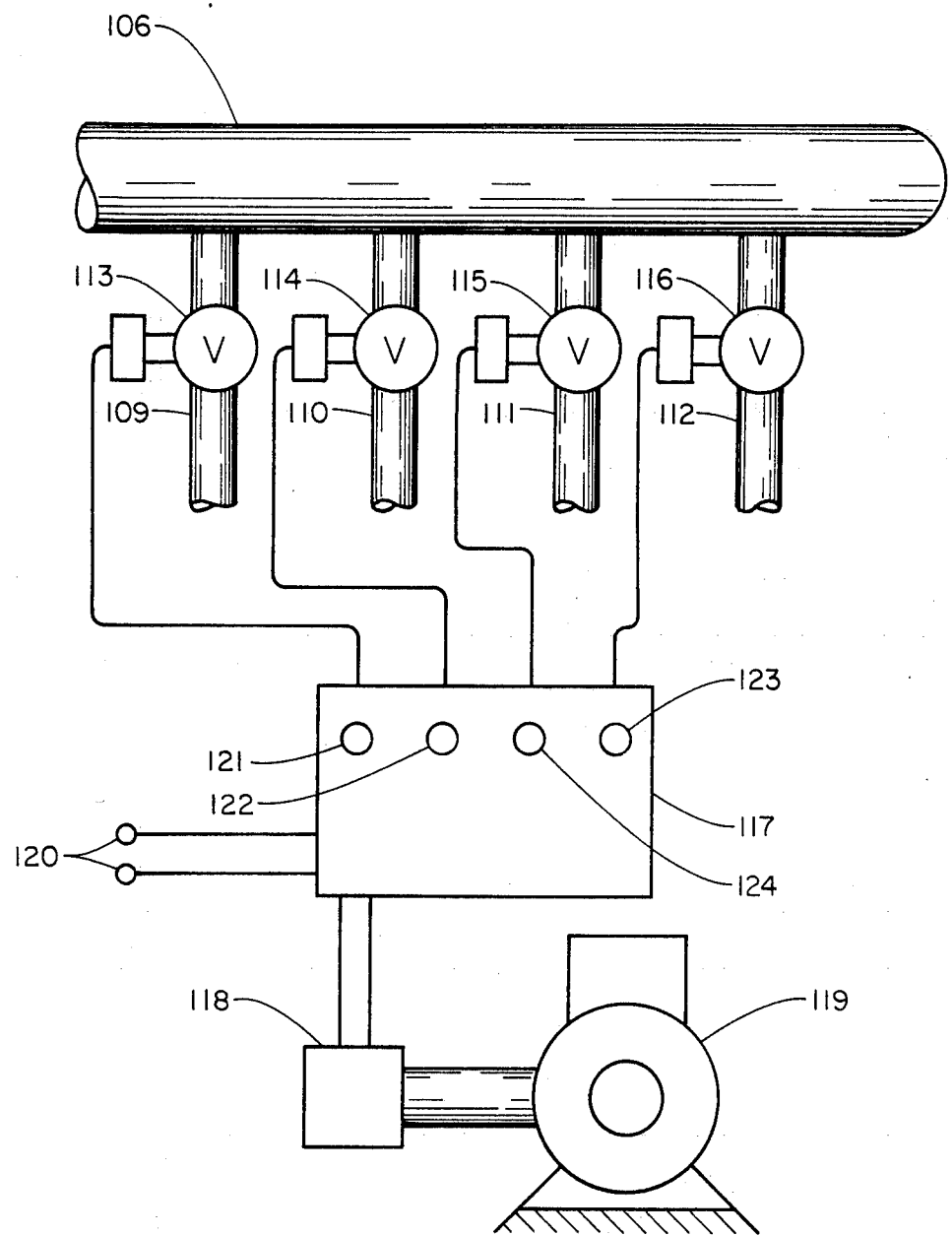

An alternative group selector valve scheme is shown in FIG. 12 comprising several separate solenoid-operated valves.

Figure 13:
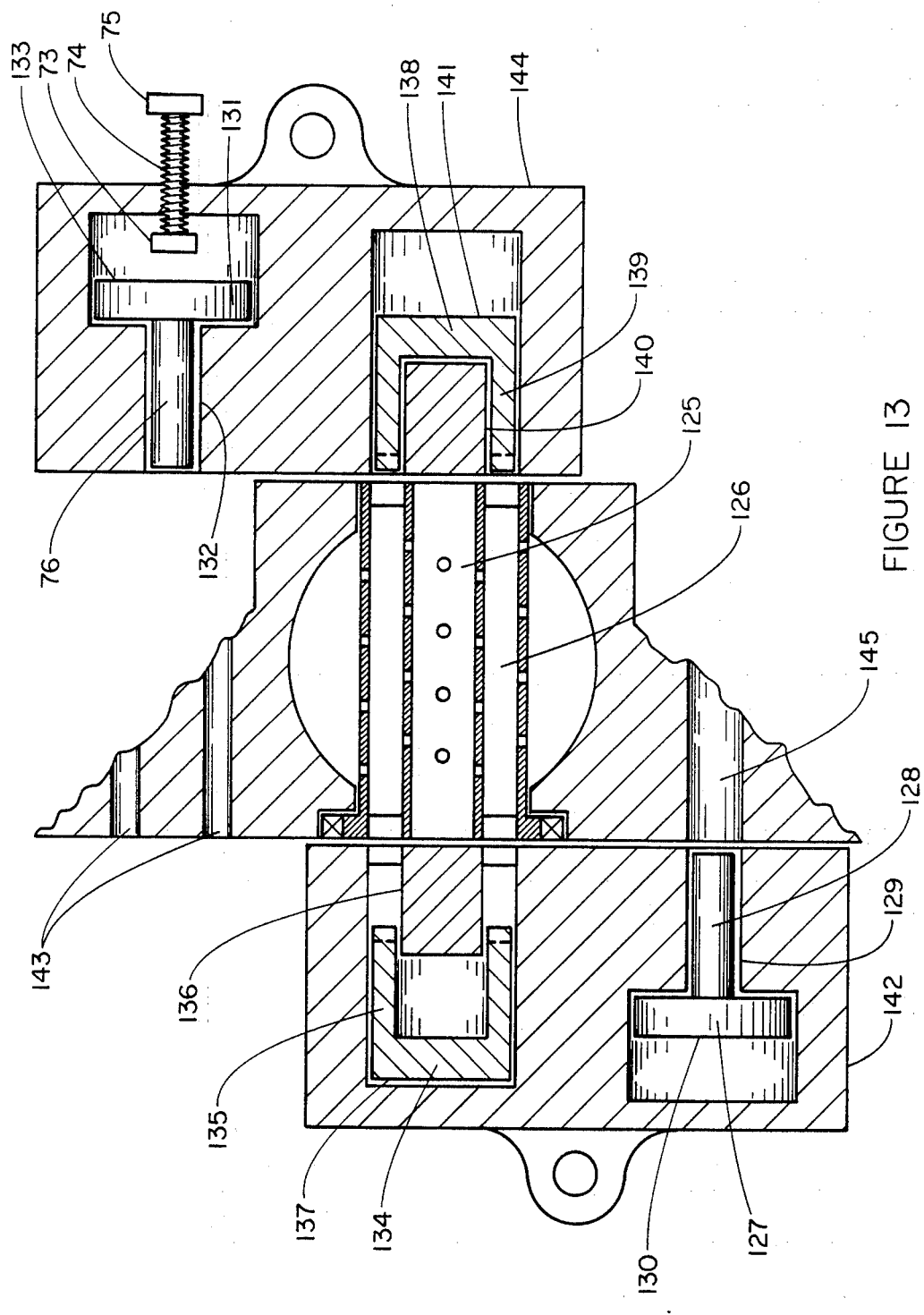

A scheme for using two separate reaction chambers, with one reaction chamber, 126, sequentially enclosing the other reaction chamber, 125, is shown in FIG. 13 with each reaction chamber having separate refill and removal means.

Figure 16:
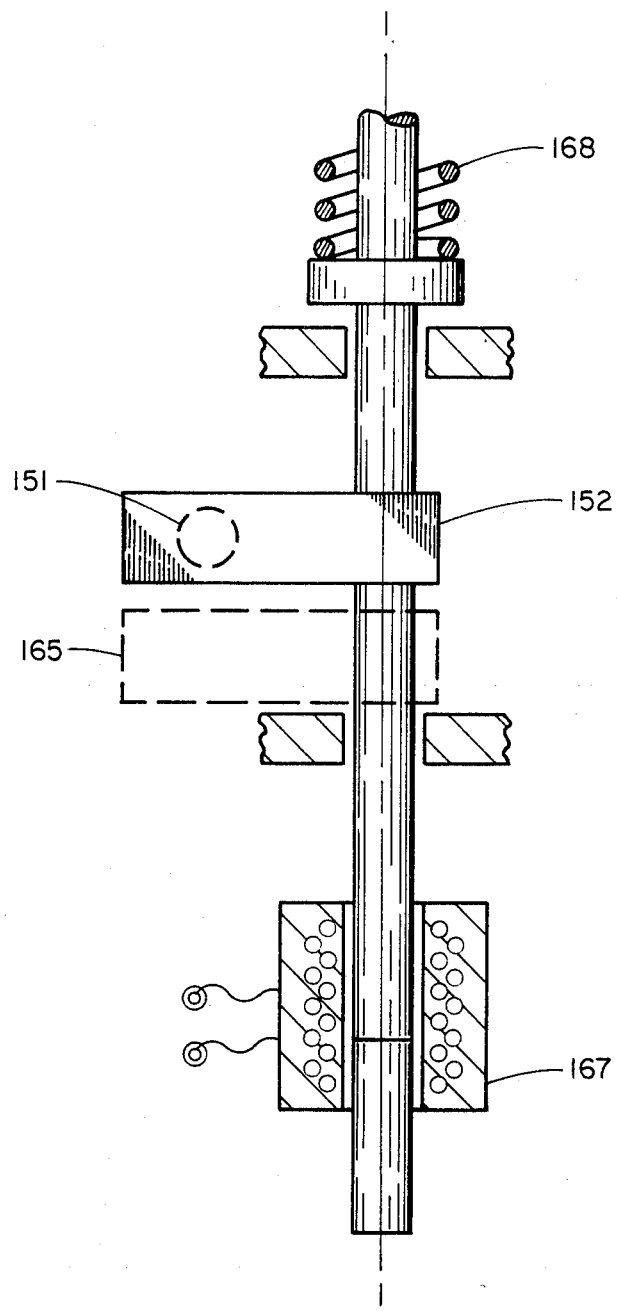

A mechanical drive means is shown in FIG. 14 and FIG. 15 suitable for the driving of refill means, removal means, compressor delivery valves, compressor discharge valves, group selector valves, etc. An electrical initiation means is shown in FIG. 16 suitable for use with the mechanical drive means of FIG. 14 in lieu of the mechanical initiation means of FIG. 15.

Figure 17:
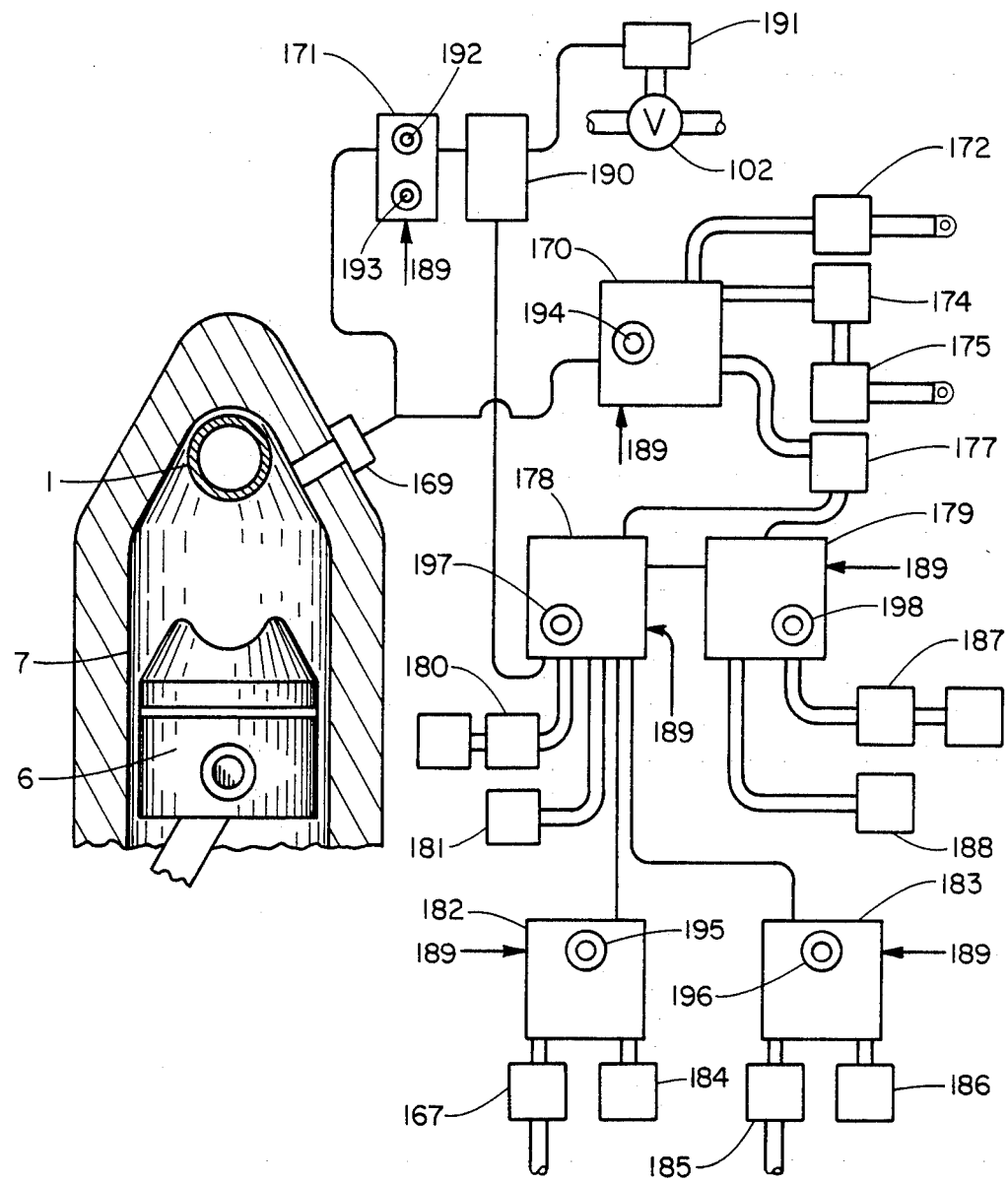

A combined control means is shown schematically in FIG. 17 for control of initiating the various drive means of a cyclic solid gas reactor.

Figure 18:
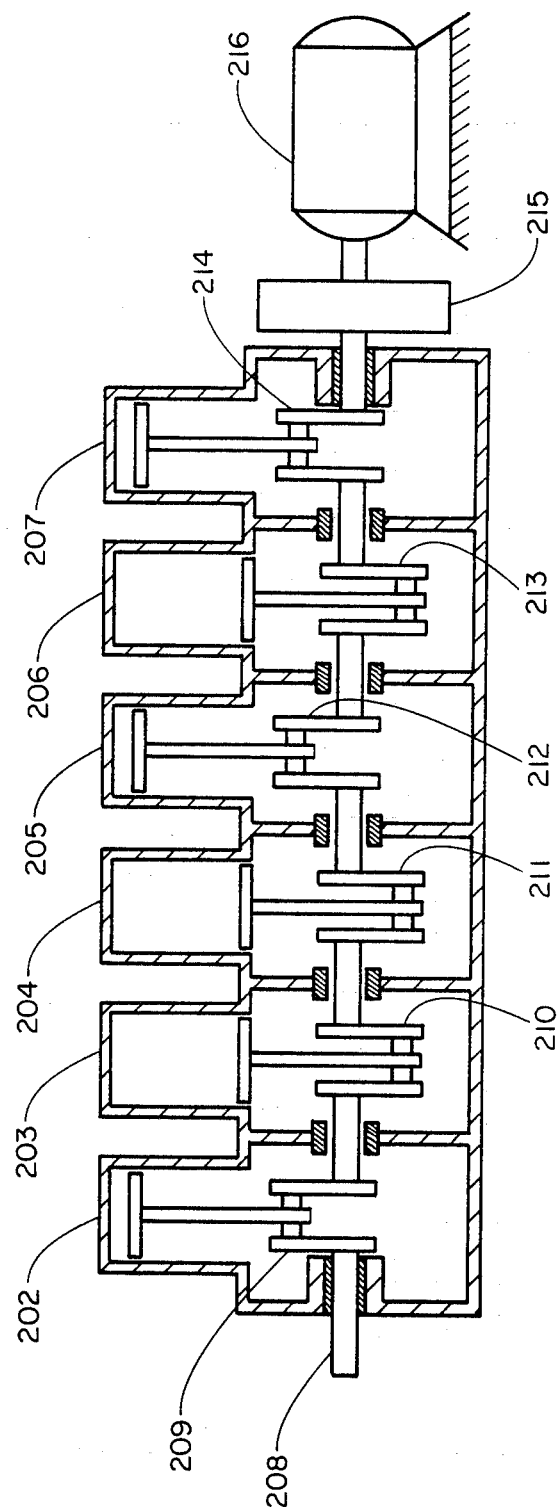

A cyclic solid gas reactor plant is shown schematically in FIG. 18 comprising six cyclic solid gas reactor machines on a common crankshaft, 208, for steady gas product formation.

DESCRIPTION OF THE PREFERRED EMBODIMENTS

I. Basic elements and function

A cyclic solid gas reator plant of this invention comprises one or more cyclic solid gas reactor machines in combination. Each such cyclic solid gas reactor machine comprises the following elements as shown, for example, in FIGS. 1 and 2:

a. at least one reaction chamber, 1, with a container, 2, to contain solid reactant separated from the compressor piston and cylinder, passages, 3, or pores to allow gas flow into and out of the container, a refill end, 4, through which solid reactant is added, and usually a removal end, 5, through which non gas product is removed;

b. a compressor means comprising; a means for compressing gases into the reaction chamber, 1, and means for expanding gases out of the reaction chamber, 1, with, as an example, a piston, 6, operative within a cylinder, 7, and connected via a connecting rod, 8, to a crank, 9; a delivery means, 10, 20, through which reactant gases are delivered into the compressor means from a first reactant gas inlet pipe, 11, and which is sealed when not delivering; a power means, 12, which drives the compressor means and absorbs any power output of the compressor means;

c. a reactant supply connecting means, 32, from at least one first reactant gas supply source, 33, to the first reactant gas inlet pipe, 11, which may be simply a pipe connection if only a single first reactant gas supply source is used;

d. in most cases a discharge means, 13, 21 will also be added to the compressor means for discharging product gases out of the compressor means into a product gas output pipe, 14, and which is sealed when not discharging;

e. if a discharge means is used a product collector connecting means, 34, from the product gas output pipe, 14, into at least one product gas collector means, 35, is also used which may be simply a pipe connection if only one product gas collector means is used;

f. at least one refill means, 15, for adding solid reactant via the refill end, 4, into the container, 2, at intervals, and comprising a refill piston, 16, and refill cylinder, 17, within a refill block, 18, a sealing means, 19, and a refill drive piston, 24;

g. at least one reload means, 22, for reloading the refill means, 15, with fresh solid reactant from a solid reactant supply source, 23;

h. in most cases at least one removal means, 25, will be used for removing non gas products from the container, 2, via the removal end, 5, and dumping the removed material outside the cyclic reactor machine, as at 26, and comprising a removal piston, 27, a removal drive piston, 28, a removal cylinder, 29, within a removal block, 30, and a sealing means, 31;

i. a sequence means for setting the number of cycles of compression and expansion occurring in sequence to which a particular mass of first reactant gas is subjected by the compressor means between deliveries of fresh first reactant gas into the compressor means;

j. means for setting the refill interval between occurrence of refilling of the container, 2, by the refill means, 15.

Except for the compressor discharge means, the product collector connecting means, and the removal means, all forms of this invention have these above-listed minimum elements and in most cases the compressor discharge means, product collector connecting means and removal means will also be used. Any of several differing forms of these elements can be used in addition to the particular forms described above and in the sketches.

These several elements of a cyclic solid gas reactor machine operate so as to first force reactant gas inside the pores of a solid reactant during compression and then expand the gas out of these pores during expansion and to carry out this alternate compression and expansion for at least one such cycle, and preferably several cycles in sequence, with the same mass of gas. Similarly, each mass of solid reactant is subjected to at least one such cycle, more usually to at least one sequence of cycles, of compression and expansion before being removed from the reaction chamber by the removal means and replaced with fresh solid reactant by the refill means. In this way, the solid reactant is brought into close contact with the gas reactant over the large interior area of the pore spaces within the solid. Additionally, the product formed by the solid to gas reaction is largely removed from these pore spaces during expansion and mixed with unreacted gas molecules before being compressed again back into the solid pore spaces. The result of this gas product purging during expansion is that gas reactant concentrations adjacent the solid reactant surface are kept high since the solid to gas reaction products are purged from the pore surfaces where formed and where these products would otherwise function as a blanket to impede access of gas reactant to the solid reactant surface. In these ways the speed of the solid to gas reaction is increased, by using all of the surface area inside the pores of the solid reactant, and by removing product blanket gas from these areas, and this increase of reaction speed is a principal beneficial object of this invention.

Figure 1:
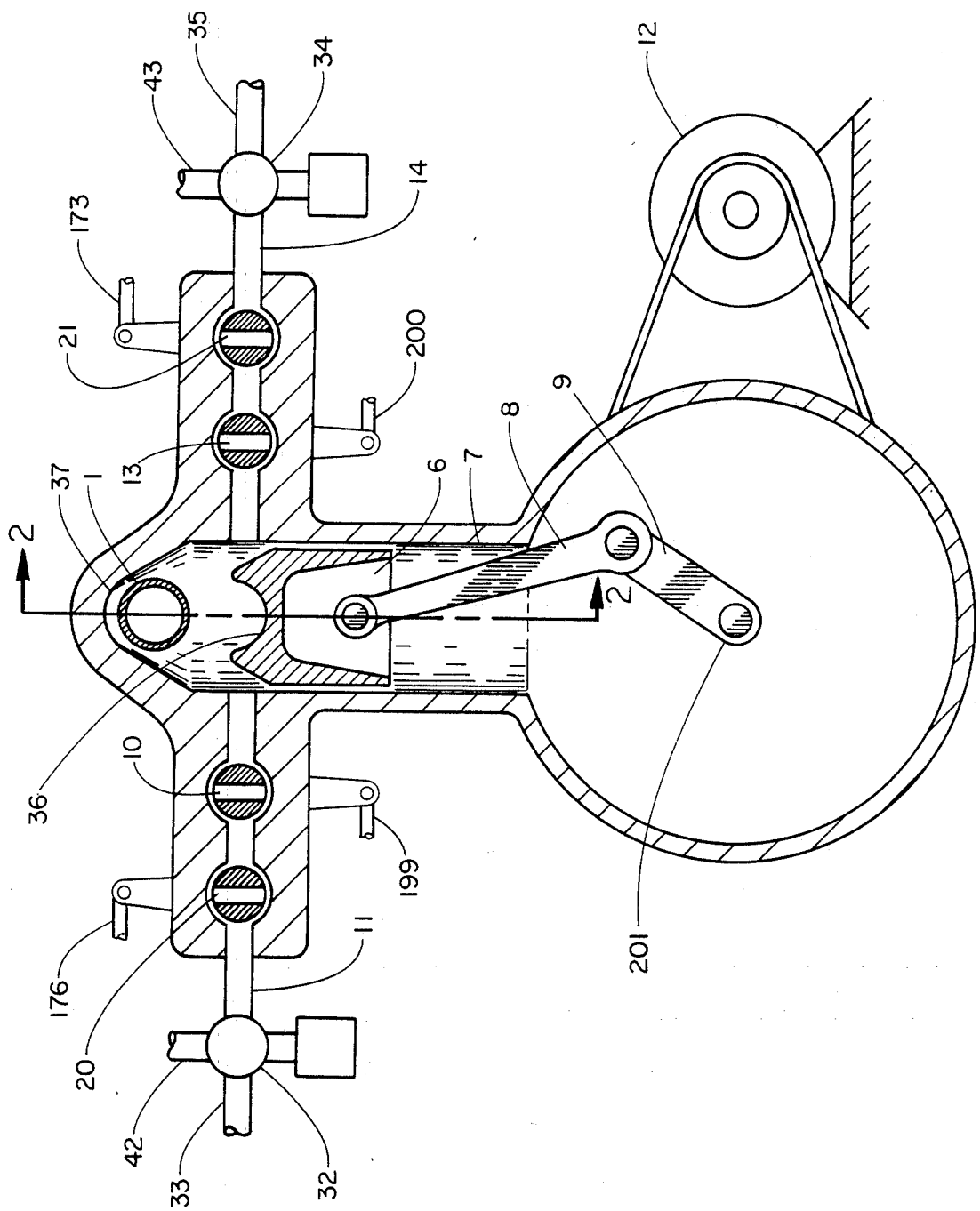
In FIG. 1 are shown a compressor expander means with delivery and discharge valves and a power means, 12.
Figure 2:
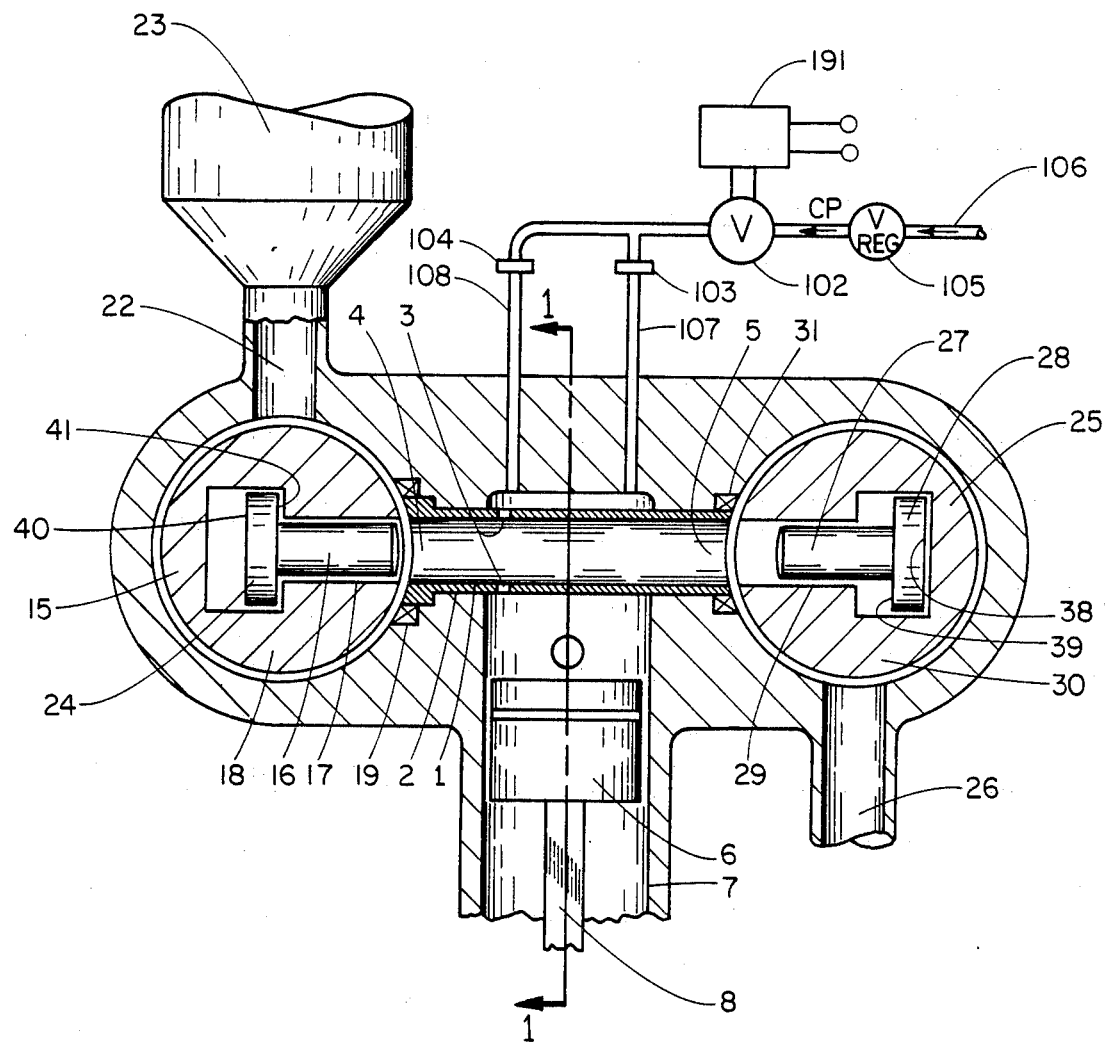
FIG. 2 is a cross-section through the reaction chamber, 1, of FIG. 1 and shows the refill means and removal means for the reaction chamber, 1.

The operation of the particular example form of this invention shown in FIGS. 1 and 2 will be described, by way of illustration, for a reactor comprising a compressor discharge means, 13, 21, and comprises the following steps.

a. a delivery process takes place by opening the delivery valves, 10, 20, while the piston, 6, is descending and increasing the volume in the reaction chamber, 1, side of the cylinder, 7, and fresh first reactant gas is drawn from the first reactant gas supply source, 33, via the reactant supply means for connecting, 32, via the reactant gas inlet pipe, 11, via the delivery valves, 20, 10, into the compressor means cylinder, 7, on the reaction chamber side of the piston, 6;

b. at the end of the delivery process the delivery valves, 10, 20, are closed at about the time when the piston, 6, has completed a volume increasing stroke and remain thus closed and sealed until the next delivery process;

c. a compression process takes place next after completion of the delivery process and the piston, 6, rises to decrease the volume of the cylinder on the reaction chamber side of the piston, thus increasing the gas pressure and forcing the delivered gas reactant via the passages, 3, into the reaction chamber container, 2, and into the pore spaces of the solid reactant within the container;

d. in most applications, but not all, we prefer to compress as much as possible of the gas reactant into the pore spaces during each compression process and for this purpose the piston crown, 36, is shaped to fit as closely as possible around the reaction chamber, 1, and the head, 37, of the cylinder, 7, is also fit as closely as possible around the reaction chamber, as shown in FIG. 1;

e. the solid to gas reaction occurs especially rapidly at maximum compression pressure, when gas reactant concentrations are maximum with most of the gas inside the pores, and when pressure and temperature are at a maximum;

f. an expansion process takes place next after each compression process and the piston, 6, descends to increase the volume of the cylinder on the reaction chamber side of the piston, thus decreasing the gas pressure and purging reactant gas and gas products out of the pore spaces of the solid reactant within the container and mixing the unreacted gas with the product gas in the main displacement volume of the compressor means;

g. so long as the delivery valves, 10, 20, and the discharge valves, 13, 21, are kept closed, and thus sealed, compression processes each followed by expansion can continue in sequence, and each such compression followed by expansion is herein termed a compression expansion cycle and a sequence of such cycles takes place wherein the reactant and product gases remain within the compressor means without any external removal of gases therefrom, the number of cycles within a sequence being any finite integral number other than zero;

h. during such a sequence of cycles the extent of solid to gas reaction may decrease for many, but not all, reactions after each cycle due to depletion of first reactant gas by reaction with the solid reactant;

i. a sequence of compression expansion cycles is ended by opening the discharge valves, 13, 21, as the piston, 6, commences to rise and is decreasing the volume of the cylinder on the reaction chamber side of the piston, and a discharge process occurs wherein gas is forced by this piston displacement out through the open discharge valves, 13, 21, the product gas output pipe, 14, the product collector connecting means, 34, and into the product gas collector means, 35, the discharge valves, 13, 21, being closed again at the end of the discharge process with the piston, 6, at or near its top dead center position nearest to the reaction chamber, 1;

j. the next delivery process follows next after a discharge process and the sequence of cycles of compression and expansion is repeated for the fresh charge of first reactant gas brought in by this next delivery process;

k. the opening and closing of the delivery and discharge valves of the compressor means can be carried out by any of several different types of valve drive means, such as mechanical, electrical, pneumatic, hydraulic, and these drive means are to operate only when initiated and to then carry out one opening and closing of the valve for each initiation;

l. initiation of the delivery and discharge valve drive means is carried out by the means for setting the number of cycles in each sequence of cycles and various kinds of setting means can be used, of which the simplest is a hand initiation of the valve drive means; more commonly an automatic means for setting will be preferred which counts cycles up to a set value of cycles and then initiates the valve drive means and also resets itself to start counting the cycles of the next sequence;

m. during the sequences of cycles of compression and expansion, the solid reactant also is reacted and non gas products are eventually to be removed from the reaction chamber, 1, via the removal end, 5, thereof by a removal process carried out by the removal means, 25, as by rotation of the removal block, 30, to align the removal piston, 27, with the dumping channel, 26, and then driving the removal piston, 27, by applying pneumatic or hydraulic pressure to the driving face, 38, of the drive piston, 28, thus forcing the non gas product material within the removal cylinder, 29, into the dumping channel, 26, the removal block, 30, and removal piston, 27, being next reverse driven back into alignment with the removal end, 5, of the reaction chamber, 1, and the piston, 27, can subsequently be retracted inside the cylinder, 29, as by application of pneumatic or hydraulic pressure to the reverse face, 39, of the drive piston, 28, while venting pressure from the driving face, 38, thereof;

n. fresh solid reactant is refilled into the reaction chamber, 1, via the refill end thereof, 4, by a refill process carried out by the refill means, 15, as by applying pneumatic or hydraulic pressure to the driving face, 40, of the refill drive piston, 24, while venting the reverse face, 41, thus forcing the refill piston, 16, to force fresh solid reactant from the refill cylinder, 17, into the reaction chamber, 1, via the refill end, 4, thereof;

o. after refilling the refill means can be reloaded with additional fresh solid reactant by the reload means, 22, as by rotation of the refill block, 18, to align with the reload means, 22, and retracting the refill piston, 16, into the refill cylinder, 17, by applying pneumatic or hydraulic pressure to the reverse face, 41, of the refill drive piston, 24, while venting the drive face, 40, thus allowing fresh solid reactant to be reloaded into the refill cylinder, 17, from the solid reactant supply source hopper, 23, via the reload means, 22;

p. any of several kinds of mechanical, electrical, hydraulic or pneumatic drive means can be used alone, or in combination, for the driving of the removal means, the refill means and the reload means, and details of some kinds of drive means suitable for this purpose are described hereinafter; these drive means are to function only when initiated and then are to carry out a single refill or removal or reload process for each such initiation;

q. initiation of the refill drive means is carried out by the means for setting the refill interval and various kinds of setting means can be used, of which the simplest is hand initiation of the refill drive means; more commonly an automatic means for setting refill interval will be preferred which counts sequences or cycles up to a set value of sequences or cycles and then initiates the refill drive means and also resets itself to start counting the sequences or cycles of the next refill interval;

r. initiation of the removal drive means is carried out by the means for setting the removal interval and this can be of a similar nature as the means for setting the refill interval;

s. the means for reloading may not require a drive means, as is shown, for example, in FIG. 2, but where a reload drive means is used it can be initiated in various ways, as by hand, or preferably automatically by the refill mechanism itself which can initiate the reload drive means upon completion of each refill process;

t. sealing means, 19, and, 31, are provided to seal against gas leakage past the refill means, 15, and the removal means, 25, during compression and expansion processes, and the refill piston, 16, and the removal piston, 27, are similarly sealably mounted inside their respective refill cylinder, 17, and removal cylinder, 29;

u. upon completion of a removal and refill process fresh solid reactant has replaced non gas products within the reaction chamber, 1, and such replacement can be partial, as with progressive refilling, or complete, as with complete refilling, and this fresh solid reactant is next exposed to sequences of cycles of compression and expansion of the first reactant gas;

v. refill and removal processes can occur at anytime including during compression expansion cycles provided proper sealing means are incorporated into the refill means and removal means; where it is desired to carry out refill or removal at lower pressure, these processes are then preferably timed to occur concurrently with discharge and delivery processes of the compressor means.

The kinds of products formed by the solid to gas reaction thusly carried out may determine which combination of basic elements is to be used in the solid to gas reactor machines of this invention as illustrated by the following cases:

A. all of the reactant gas is combined into the non gas product and hence a compressor discharge means is not necessary, but a non gas product removal means is required;

B. all of the solid reactant is reacted into a gas product and hence a removal means is not necessary, but a compressor discharge means is required;

C. only some of the reactant gas is combined into the non gas product and/or only some of the solid reactant is reacted into a gas product and hence both a removal means and a compressor discharge means are required, and this is the most common case.

Compression of the reactant gas during each compression process requires input of mechanical work from the power means, 12, whereas expansion of the reactant gas during each expansion process produces a mechanical work output to be absorbed by the power means, 12. The nature of the solid to gas reaction being carried out in the solid to gas reactor machine may determine the kind of power means, 12, to be used as illustrated by the following cases:

D. expansion work output exceeds compression work input and a net work output results, as with most exothermic reactions, and the power means, 12, can comprise any power absorber such as an electric generator, or a pump, combined with a flywheel to store sufficient energy to carry through each compression process;

E. compression work input exceeds expansion work output and a net work input results, as with most endothermic reactions, and the power means, 12, can comprise an electric motor or other type of driving engine with or without a flywheel;

F. net work varies during or between one or more sequences from an output to an input, and the power means, 12, is called upon to drive the compressor means at some times and to absorb work output at other times, an electric motor-generator unit such as an induction motor can be used as a power means for this case or the power means can comprise separate drive means and power absorbing means together and with or without a flywheel.

The ability of the several forms of this invention to usefully recover any net work output from the cyclic reactor machine is another principal beneficial object.

II. Added elements and function

To the above-described basic forms of this invention, several different elements can be added in order to carry out different combinations of solid to gas reactions or for product separation purposes. The principal added elements comprise: delivery group valve; discharge group valve; additional reactant gas admission means; two or more reaction chambers.

A delivery group valve is a particular form of the reactant supply connecting means, 32, which is capable of connecting the first reactant gas inlet pipe, 11, of the compressor means to other and different first reactant gas supply sources, 42, in addition to the original first reactant gas supply source, 33, one source at a time. With a delivery group valve the solid reactant within the reaction chamber, 1, may be reacted with type one first reactant gas for a group of several cycles or for several sequences of cycles, and then be reacted with type two first reactant gas for another group of several cycles or for several sequences of cycles, and so on through several different types of first reactant gases, before commencing again with the type one first reactant gas to repeat these several groups of sequences of cycles again in the same order. Each time the several groups of sequences of cycles are repeated in the same order by action of the delivery group valve, a delivery batch of groups of sequences of cycles is carried out. While the delivery group valve remains connected to but one of the first reactant gas supply sources but a single group of sequences of cycles is being carried out. A delivery group valve thus comprises: a selector valve with a number of inlet ports each connected to but one of the equal number of first reactant gas supply sources, and an outlet port connected to the inlet of the first reactant gas supply pipe of the compressor means; a drive means which, when initiated, drives the selector valve to disconnect from one first reactant gas supply source and to connect to the next first reactant gas supply source in an inlet order of connections between the first reactant gas inlet pipe of the compressor means and the several first reactant gas supply sources, and for repeating this inlet order of connections; and a delivery group means for setting the number of sequences of cycles in each group of sequences of cycles by initiating the selector valve drive means at the end of each group to drive the selector valve on to connect to the next inlet port in order and to thus commence the next group. Various types of selector valves and drive means can be used with the delivery group valve such as: a rotary valve with several inlet ports and a single outlet port and mechanically driven to connect the outlet port to the inlet ports, one port at a time, in the desired inlet order; several solenoid actuated valves, one on each reactant gas supply source and a selector circuit to open one solenoid valve at a time in the desired inlet order; etc. Various kinds of delivery group means for setting the number of sequences in each group can be used, of which the simplest is a hand initiation of the selector valve drive means. More commonly an automatic means for setting will be preferred which counts sequences up to a set value of sequences and then initiates the selector valve drive means and also resets itself to start counting the sequences of the next group.

One particular example of a delivery selector valve is shown in FIG. 8 of a rotary type, comprising a moving valve element, 77, rotating sealably inside a stationary housing, 78, fitted with inlet ports, 79, 80, 81, 82. The moving valve element, 77, connects via its outlet port, 83, always to the first reactant-gas supply pipe, 11, and via its moving port, 84, to the inlet ports, 79, 80, 81, 82, one port at a time in a fixed inlet order of connectings. The inlet ports, 79, 80, 81, 82, connect separately to four different first reactant gas supply sources. The moving port, 84, can be thusly moved in the direction, 96, through the inlet order of connectings by various kinds of group valve drive means and control means of which one particular example is shown in FIGS. 9, 10 and 11. The ratchet wheel, 85, of FIG. 9 is connected to and drives the moving valve element, 77, directly and is itself rotated by the moving pawl, 86, of the oscillating member, 87, and prevented from back rotating by the fixed pawl, 88. The oscillating member, 87, is rotated back and forth through an arc of ninety degrees about the centerline of rotation, 89, of the ratchet wheel, 85, by the bar, 90. An example of an electrical drive for moving the bar, 90, is shown schematically in FIG. 10 and comprises a solenoid, 91, which moves the bar, 90, in the direction, 92, when energized, and a spring, 93, which moves the bar, 90, in the direction, 94, when the solenoid is not energized, this being the desired back and forth drive motion for the oscillating member, 87, in FIG. 9. The solenoid, 91, is energized via a control means comprising the power source, 95, the initiator switch, 97, the paired single pole double throw switches, 98, 99, and the reset switch, 100. When the set value of sequences counts in reached by the means for setting the number of sequences in each group, the initiator switch, 97, is closed and the switch 99 is closed by the trip bar, 101, which moves with the bar, 90. With switches, 97, and, 99, thusly closed power flows to energize the solenoid, 91, and move the bar, 90, through a full stroke in the direction, 92, rotating the oscillating member, 87, and thus rotating the selector valve moving element, 77, to disconnect from one inlet port, 79, and reconnect to the next inlet port, 80, in the inlet order of connections, thus terminating one group of sequences and commencing the next group. At the end of this stroke of the bar, 90, the trip bar, 101, opens the switch, 98, thus deenergizing the solenoid, 91, and actuates also the reset switch, 100, which resets the counting means of the means for setting to start counting sequences again and also opens the initiator switch, 97. With the solenoid thusly deenergized the bar, 90, and trip bar, 101, are moved by the spring, 93, in the direction, 94, for a full stroke at the end of which the trip bar, 101, closes again the switch, 99, and the selector valve drive means is again ready to drive the selector valve on to the next inlet port when the next group of sequences is completed. The paired switches, 98, 99, are wired as shown in FIG. 11 so that whenever switch 98 is tripped, the circuit is opened and whenever switch 99 is tripped, the circuit is closed, and these switches assure that the bar, 90, makes a full stroke of motion in both directions, 92, 94, each time the initiator switch, 97, is closed by the means for setting the number of sequences in each group. In this way the selector valve outlet port, 83, is connected in turn to each of the inlet ports, 79, 80, 81, 82, via the moving port, 84, and this inlet order of connections is then repeated for each batch of groups of sequences of cycles.

A discharge group valve is a particular form of the product collector connecting means, 34, which is capable of connecting the product gas output pipe, 14, of the compressor means to other and different product gas collector means, 43, in addition to the original product gas collector means, 35, one collector means at a time. With a discharge group valve, the gaseous products formed within the reaction chamber, 1, can be separated into separated portions within the separate product gas collector means. Use of a discharge group valve is preferred where the product gases change composition as between different sequences of cycles and it is desired to further utilize these different product gas for different purposes.

With a discharge group valve the gaseous products discharged from the compressor means via the discharge means, 13, 21, may be directed into one product gas collector means, 35, for a group of several cycles or for several sequences of cycles, and may then be redirected into another product gas collector means, 43, for another group of several cycles or for several sequences of cycles, and so on through several product gas collector means before connecting again with the collector means, 35, to repeat these several groups of sequences of cycles again in the same order. Each time the several groups of sequences of cycles are repeated in the same order by action of the discharge group valve, a discharge batch of groups of sequences of cycles is carried out. While the discharge group valve remains connected to but one of the product gas collector means but a single group of sequences of cycles is being carried out. Except for the gas flow direction between ports, as described above, a discharge group valve is similar to the delivery group valves already described above and carries out an outlet order of connections which is repeated.

A cyclic solid gas reactor machine of this invention may comprise a delivery group valve without a discharge group valve, or a discharge group valve without a delivery group valve, or both a delivery group valve and a discharge group valve, depending upon the intended uses of the machine as illustrated in the following examples:

A. where the principal useful products are non gaseous products formed by reacting solid reactants with two or more first gas reactants and the gas product is of no value, only a delivery group valve would be used;

B. where principal useful products are gas products, formed by reacting solid reactants with a single first gas reactant, and whose composition changes during a sequence or between sequences, only a discharge group valve would be used to separate these product gases of different composition;

C. where principal useful products are gas products, formed by reacting solid reactants with two or more first gas reactants, and whose composition changes during a sequence or between sequences both a delivery group valve and a discharge group valve would be used.

Commonly where both a delivery group valve and a discharge group valve are used together the product gas composition changes because the delivery group valve has changed connection to a different first gas reactant supply source. In this case, it will usually be preferred to change the discharge group valve connection at the same time that the delivery group valve connection is changed. For this purpose, a relative timing means can be used to time the discharge group means for setting and the delivery group means for setting so that a batch of delivery sequences starts and ends at the same time as a batch of discharge sequences. This relative timing means can be any of various types, of which the simplest is simultaneous hand initiation of both selector valve drive means. Automatic relative timing means will usually be preferred, such as using a single common drive means to drive both the delivery selector valve and the discharge selector valve which can be initiated by a single common group means for setting the number of sequences in each group.

Where a principal useful product is non gaseous, it will usually be preferred that each portion of solid reactant remain within the reaction chamber through at least one delivery batch of groups of sequences so as to be reacted with all of the different first reactant gases. With complete refilling of the reaction chamber, each solid reactant portion remains inside the reaction chamber for only one refill interval which equals the removal interval. For this case, the refill interval preferably equals a number of sequences equal to an integral multiplier, other than zero, times the number of sequences in one delivery batch of groups of sequences. This refill interval number of sequences may then become the set value of sequences for the means for setting the refill interval. With progressive refilling of the reaction chamber, each portion of solid reactant remains inside the reaction chamber for more than one refill interval, and preferably an integral number, other than zero, of refill intervals. For this case, the refill interval preferably equals a number of sequences equal to the number of sequences in one delivery batch of groups of sequences multiplied by the ratio of another selected integer, other than zero, divided by the integral number of refill intervals during which a solid reactant portion remains inside the reaction chamber. The selected integer is preferably selected to yield a refill interval which is an integral number of sequences and this may then become the set value of sequences for the means for setting the refill interval.

Where the solid reactant is to be reacted simultaneously with two or more reactant gases, these can be premixed and supplied together as a first reactant gas. Alternatively, and often preferably, one or more of the additional reactant gases can be admitted separately from the first reactant gases via an admission means. The admission means admits these additional reactant gases from their supply sources directly into the compressor cylinder on the reaction chamber side of the piston and during some of the compression and/or expansion processes but not during the delivery or discharge processes. In this way, dilution of the first reactant gases by the additional reactant gases is avoided and higher gas reactant concentrations and hence faster reactions are obtained.

In general, each additional reactant gas will usually be desired to be admitted only during certain selected cycles of certain selected sequences of certain selected groups of certain selected batches during each refill interval and these selected cycles are the admission cycles for that additional reactant gas. The admission cycles may be different as between different additional reactant gases. In this way, the additional reactant gas can be admitted only when needed to react simultaneously with a particular first reactant gas upon the solid reactant.

Commonly, the additional reactant gas will preferably be admitted during the first compression process of the first cycle of the selected sequences so that the additional reactant gas is available for reaction throughout the entire sequence. To avoid dilution of the first reactant gas delivered during the delivery process which immediately precedes this preferred admission cycle the admission is preferably delayed until this first compression process has commenced and the preceding delivery process has ended. To avoid wasting additional reactant gas unreacted into a discharge process, the admission is preferably ended prior to the end of the last expansion process of the last cycle of the selected sequences.

Each admission means comprises: at least one admission delivery means for delivering the additional reactant gases into the compressor cylinder; a cycle selector means for timing admission delivery to take place only during the selected admission cycles; a cycle timer means for timing admission delivery to start after compression starts and to end before expansion ends; a quantity control means to control the quantity of additional reactant gas admitted during each admission cycle. Various kinds of admission delivery means, cycle selector means, cycle timer means, and quantity control means can be used. For example, where the additional reactant gas is supplied from the source at a pressure well above that needed to force it into the compressor cylinder, the admission delivery means can be a delivery valve operated either mechanically via cams or electrically via a solenoid, the quantity control means can be a metering orifice or a metering orifice together with a gas pressure regulator, the cycle selector means can be mechanical cams driven at suitably reduced speed from the compressor shaft and acting to open the delivery valve and these same cams can also function as the cycle timer means. Alternatively, the cycle selector means can be an electrical counter circuit which counts cycles, sequences, groups and batches and closes one part of a circuit to energize a solenoid to open the delivery valve on the selected admission cycles, the other part of this energizing circuit for the solenoid being closed by pressure switches in the compressor cylinder which function as a cycle timer means to assure that the delivery valve opens only when the pressure rises above a certain value and closes when the pressure drops below a certain value.

An example admission means is shown partially in FIG. 2 and comprises a solenoid actuated valve, 102, as an admission delivery means, and metering orifices, 103, 104, and a gas pressure regulator, 105, as a quantity control means, and can admit high pressure gas from an additional reactant gas supply source, 106, into the reactor cylinder, 7, on the reaction chamber, 1, side of the piston, 6, via the passages, 107, 108. An electrical cycle selector means and cycle timer means suitable for use with this solenoid actuated admission delivery means will be described hereinbelow.

For another example, where the additional reactant gas is supplied from the source at a pressure too low to force it into the compressor cylinder a piston and cylinder positive displacement gas pump with suction and delivery check valves can be used as an admission delivery means to pump the additional reactant gas from the low pressure supply source up to a pressure adequate to force it into the compressor cylinder. This positive displacement gas pump can be driven by cams driven at suitably reduced speed from the compressor shaft and these cams can function as both the cycle selector means and the cycle timer means. This positive displacement gas pump delivery means could alternatively be driven pneumatically or hydraulically or by other means. The quantity control means can be a suction pressure regulator to adjust the pressure at the delivery means pump suction or can be a means for controlling the displacement of the positive displacement gas pump delivery means.

When two or more separate additional reactant gases are used, each separate additional reactant gas can be delivered via its own separate admission delivery means. If, however, some or all of these separate reactant gases are always admitted into separate cycles, the number of admission delivery means used in each admission means can be reduced by using one of the admission delivery means to admit several different reactant gases into several different admission cycles, but one reactant gas being admitted by any one admission delivery means during any one admission cycle. This latter scheme requires adding to the admission means an admission selector valve between this multiple admission delivery means and those several additional reactant gas sources from which this multiple admission delivery means is to admit reactant gas, and a drive means to drive the admission selector valve to connect the multiple admission delivery means to the desired additional reactant gas source for the selected cycles of the selected sequences.

An example admission selector means is shown partially in FIG. 12 and comprises: four different additional reactant gas supply sources, 109, 110, 111, and, 112, with four separate solenoid actuated valves, 113, 114, 115, 116, each connecting one of the supply sources to the admission delivery means inlet, 106; an electrical cycle selector means, 117, with a cycles counter means, 118, which counts shaft revolutions of the compressor means, 119; and electrical power source, 120. The electrical cycle selector, 117, selects to which the cycles counted by the cycles counter means, 118, each of the separate different additional reactant gases, 109, 110, 111, 112, is to be admitted and opens the appropriate solenoid actuated valve, say 113, with but one of these solenoid valves, 113, 114, 115, 116, being open for any one admission cycle. Adjustment knobs, 121, 122, 123, 124, can be provided in the cycle selector means, 117, to permit adjustment of which cycles are selected as admission cycles for each of the separate different additional reactant gases, 109, 110, 111, 112. This multiple valve selector means can also be adapted for use as a delivery or discharge group valve.

Where two or more solid reactants are to be reacted simultaneously with and via one or more gas reactants, these can be premixed and supplied together into a single reaction chamber from a single solid reactant supply source. In some cases, however, such premixing of separate solid reactants leads to unwanted solid to solid reactions and in these cases a separate reaction chamber is preferably used for each solid reactant. Each such separate reaction chamber is connected to be refilled by a separate refill means which is connected to be reloaded by a separate reload means which receives solid reactant from a separate solid reactant supply source. Usually, though not always, each such separate reaction chamber is also connected for removal of non gas products therefrom by a separate removal means which dump these removed products so as to keep them separated outside the reactor machine. Where the non gas products to be removed are of no value, a single removal means could be used for all of the separate reaction chambers.

Where two or more solid reactants are to be reacted separately with one or more gas reactants, these can be thusly reacted in separate reaction chambers within a single cyclic solid gas reactor machine. However, it will usually be preferable for these cases to use separate cyclic solid gas reactor machines for each of the separate solid reactants.

Where two or more solid reactants are to be reacted sequentially with and via one or more gas reactants, these can be thusly reacted in separate, sequentially enclosed, reaction chambers within a single cyclic solid gas reactor machine. This case is perhaps best illustrated with the specific example of the reduction of solid iron ore by solid coke using oxygen from the air as a first reactant gas. The oxygen reacts with the coke to form carbon monoxide which reacts, in turn, with the iron oxide to form the desired iron as product and carbon dioxide gas. This carbon dioxide reacts, in turn, with coke to form additional carbon monoxide which again reacts with iron oxide and so the process continues. Note that in this iron ore reduction process the first reactant gas is to react sequentially with the solid reactants in the order: air with coke; carbon monoxide with iron ore; carbon dioxide with coke; and so on. Preferably also the iron ore is not contacted with air since this leads to oxidation of any reduced iron back to iron oxide. Also preferably the iron ore is not contacted with coke since this leads to an iron metal product saturated with dissolved carbon which must be subsequently removed for production of steel. These several solid to gas reaction requirements can be very well met by a cyclic solid gas reactor machine of this invention by sequentially enclosing the separate iron ore reaction chamber with another separate coke reaction chamber. In this way, first reactant gas is forced during compression processes first through the coke reaction chamber and then into the enclosed iron ore reaction chamber so that little or no oxygen but carbon monoxide reaches the iron ore to reduce it to iron. Subsequently, during expansion processes the carbon dioxide formed in the iron ore reaction chamber is reduced again to carbon monoxide while passing through the enclosing coke reaction chamber and is thus ready for further iron ore reduction during the next compression process in the sequence. This sequence can be continued on a single charge of first reactant gas through several cycles during each of which the desired sequential reaction is carried out and each such sequence can be continued until the reaction energy release fails to maintain adequate solid reactant temperatures to sustain the desired reactions. Note also that the iron ore need not be in contact with the coke so undesireable solution of carbon in the iron product can be prevented and a steel product formed directly in the inner iron ore reaction chamber. For this illustrative example, the separate reaction chambers are fitted with separate refill, reload and removal means in order to keep the solid reactants as well as the non gas products always separated. This iron ore reduction example serves to illustrate some of the beneficial objects achievable by use of the machines of this invention, that sequential reactions of two or more solid reactants with and via one or more gas reactants can be carried out quickly and without undesirable reactions between the separate solid reactants. In prior art iron ore reduction blast furnaces, some air contacts reduced iron with resultant loss of product, the iron product is saturated with carbon since the coke and iron are in contact, and mechanical work is not recoverable from the heat of the overall reaction, and these deficiencies of the prior art are overcome in the cyclic solid gas reactor machines of this invention.

An illustrative example of two separate sequentially enclosed reaction chambers with separate refill means and removal means is shown partially in FIG. 13 and comprises an inner reaction chamber, 125, enclosed by an outer reaction chamber, 126, so that during compression processes the first reactant gas flows first through the outer reaction chamber, 126, before entering the inner reaction chamber 125. The inner reaction chamber, 125, is refilled by the inner refill mechanism, 127, with refill piston, 128, refill cylinder, 129, and refill drive piston, 130, which can be pneumatically or hydraulically driven. Non gas products are removed from the inner reaction chamber, 125, by the inner removal mechanism, 131, with removal piston, 76, removal cylinder, 132, and removal drive piston, 133, which can be pneumatically or hydraulically driven. The outer reaction chamber, 126, is similarly refilled by the outer refill mechanism, 134, with annular refill piston 135, annular refill-cylinder, 136, and refill drive piston, 137. Similarly, non gas products can be removed from the outer reaction chamber, 126, by the outer removal mechanism, 138, with annular removal piston, 139, annular removal cylinder, 140, and removal drive piston, 141. The common refill block, 142, can be driven to align the outer refill mechanism, 134, with the outer reaction chamber, 126, as shown in FIG. 13, with the inner refill mechanism, 127, then aligned with the inner reload means, 145. Subsequently, the refill block, 12, can be driven to align the inner refill mechanism, 127, with the inner reaction chamber, 125, at which position the outer refill mechanism, 134, is aligned with the outer reload means, 143. The common removal block, 144, can be similarly driven to alternately align the inner removal mechanism, 131, and the outer removal mechanism, 138, with their respective inner reaction chamber, 125, and outer reaction chamber, 126.

III. Modified elements and function

The nature of the non gas products formed by reaction in the reaction chamber imposes requirements upon the removal means which is to remove them from the reaction chamber. These non gas products may be wholly solids, or wholly liquids, or mixtures of solids and liquids. Wholly gas products are, of course, removed via the discharge means of the compressor means. Displacement removal means, such as shown, for example, in FIG. 2 and described hereinabove, can be used for removal of all of these forms of the non gas products. However, when all or a major portion of non gas products are liquid, the reaction chamber is positioned vertically so that gravity will cause these liquids to drain into the removal means positioned at the bottom of the reaction chamber. Alternatively, for wholly or largely liquid non gas product a bleed valve or a bleed orifice can be used as a removal means. An example bleed valve is shown partially in FIG. 3 and comprises a bleed valve, 44, positioned in the bottom removal end of a reaction chamber, 1, and seating when closed against a seat portion, 45, of the removal end, 5. The bleed valve, 44, can be opened to allow liquid non gas product to flow out of the reaction chamber, 1, via the removal end, 5, and flow passage, 46, thereof, by the rod, 47, and levers, 48, 49, and is closed by action of the closing spring, 50, and the reaction chamber pressure acting on the valve head, 51. The closing spring, 50, may not be needed where reaction chamber pressures alone ar adequate to cause bleed valve closing. The lever, 49, can be actuated to open the bleed valve, 44, when a removal process is to take place by the removal drive means, not shown in FIG. 3, and the bleed valve, 44, is released by the drive means to close when the removal process is completed. Where a liquid non gas product is formed reasonably steadily and continuously, a bleed orifice alone can comprise the entire removal means and this orifice is sized to bleed the liquid continuously at a rate which keeps enough liquid in the removal end, 5, of the reaction chamber to function as a gas sealing means. An adjustable bleed orifice can also be used wherein the bleed orifice area is adjusted so as to hold a gas sealing portion of liquid inside the removal end, 5, of the reaction chamber, 1.

The non gas products of a different volume than the solid reactant from which they are formed. If these non gas products are of the same or a lesser volume than the solid reactant, the removal means displacement can be of the same or lesser volume than the refill means displacement. When, however, the non gas products are of a larger volume than the solid reactant, the reaction chamber walls, 2, are preferably tapered with cross-sectional area increasing toward the removal end, 5, to minimize the chance of jamming of the solids by expansion. Also for these volume increase cases, removal means displacement is larger than refill means displacement and a portion of the refill means or preferably the removal means is made adequately flexible to accommodate this expansion while reaction is going on during the refill interval and the removal interval.

The temperature of the solid reactant required to sustain the desired solid to gas reaction can impose requirements on the extent of removal and refill of the reaction chamber occurring on each refill process and removal process. Where the rapid reaction temperature is less than or no greater than the temperature reached by the first reactant gas during the compression processes complete removal and refill of the reaction chamber can be used wherein essentially the entire reaction chamber contents are removed and replaced with fresh solid reactant by each removal process and refill process. Where the rapid reaction temperature is greater than the temperature reached by the first reactant gas during the compression processes, and the reaction is exothermic, progressive removal and refill of the reaction chamber is preferred wherein only a portion of the reaction chamber contents are removed and replaced with fresh solid reactant by each removal process and refill process. With this progressive removal and refill, a portion of the reaction chamber contents remains in the chamber after each removal to heat up the refilled cold fresh solid reactant by direct contact to the required rapid reaction temperature. Where the solid to gas reaction is endothermic, the compression ratio of the compressor means is preferably made high enough that the first reactant gas reaches the rapid reaction temperature during compression processes. Where this preferred compression ratio cannot be used, auxiliary heating of the solid reactant, as by electric heating elements in the reaction chamber walls, may be necessary for endothermic or thermo neutral reactions.

An illustrative example complete refill and removal means is shown partially in FIGS. 4 and 5 and comprises: a refill mechanism, 52, with refill piston, 53, and refill cylinder, 54, in a moveable refill block, 55; a removal mechanism, 56, with removal piston, 57, and removal cylinder, 58, in a moveable removal block, 59. As shown in FIGS. 4 and 5, the refill means, 52, is aligned with the refill end, 4, of the reaction chamber, 1, the removal means, 56, is aligned with the removal end, 5, of the reaction chamber, and simultaneous complete removal and refill have just taken place by occurrence of a full stroke of the refill piston, 53, and the removal piston, 57, with refill piston stroke length equalling reaction chamber length. For reloading the refill mechanism block, 55, is moved to one side as shown in the dashed outline position of FIG. 4 and the refill piston, 53, is retracted a full stroke length so that the refill cylinder, 54, may be completely reloaded with fresh solid reactant by the reload means not shown in FIG. 4. For dumping the removal mechanism block, 59, is moved to one side as shown in the dashed outline position of FIG. 5 and the removal piston, 57, is pushed a full stroke length through the removal cylinder, 58, thus dumping the removed non gas products outside the cyclic solid gas reactor machine. The drive means for thusly driving the refill and removal pistons and blocks are not shown in FIGS. 4 and 5 but suitable drive means therefor are described hereinbelow.

The refill and removal means shown in FIG. 2 and already described hereinabove is an illustrative example of a progressive refill and removal scheme provided the stroke length of the refill piston, 16, is less than the length of the reaction chamber, 1.

The flow rate of solid reactant into the cyclic solid gas reactor can be increased or decreased in several ways as for example:

a. increasing or decreasing the quantity removed by each removal process and using a refill means which fully replaces whatever was removed, as with progressive refill and removal;
b. increasing or decreasing the quantity refilled by each refill process and using a removal means which fully removes whatever was displaced during refill, as with progressive refill and removal;
c. shortening or lengthening the refill interval when using a fixed refill quantity as with complete refill and removal;
d. shortening or lengthening the removal interval when using a fixed removal quantity as with complete refill and removal;
e. combinations of these solid reactant flow rate adjustment methods may also be used, such as refill interval adjustment with progressive refill and removal.

Such adjustment of solid reactant flow rate can be done by hand or automatically in response to the extent of desired product formation.

One example apparatus for adjusting the solid reactant flow rate via adjustment of the refill quantity is shown partially in FIGS. 6 and 7 and comprises a refill piston, 60, driven by a spring, 61, a hopper source of solid reactant, 62, a hopper valve, 63, a reload cylinder, 64, and a reload ram, 65, and these are shown in FIG. 6, aligned for reload with the refill cylinder, 66, and refill piston, 60. From the hopper, 62, a quantity of fresh solid reactant is delivered, by rotation of the hopper valve, 63, into the reload cylinder, 64. The reload ram, 65, then forces this solid reactant quantity into the refill cylinder, 66, and against the spring loaded refuel piston, 60. The volume of the cavity, 67, as shown in FIG. 7 in the hopper valve, 63, and hence the refill quantity is adjustable by moving the cavity block, 68, via the control link, 69, the cavity block being preferably locked when refilling from the hopper, 63, occurs and released for control link adjustment when the hopper valve is empty and being rotated back after delivering the solid reactant quantity into the reload cylinder, 64. The hopper valve, 63, can be rotated by any one of several means as, for example, via linkwork from the refill block, 70, as the refill block moves into the reload position at the end of a refill process.

The reload ram, 65, can deliver the refill quantity into the refill cylinder, 66, against the spring loaded refill piston, 60, and the reload ram, 65, then holds a fixed position flush with the sliding surface, 71, of the refill block, 70, until the next refill process has commenced, in order to prevent the refill quantity from spilling back into the reload cylinder, 64. Subsequently, the reload ram, 65, can be withdrawn to pick up the next solid reactant quantity. The reload ram, 65, can be positively driven as described above with any of the positive drive means to be described hereinbelow. After thusly reloading the refill block, 70, is moved to align the refill piston, 60, with the refill end, 4, of the reaction chamber, 1, when a refill process commences, and the refill spring, 61, and piston, 60, then force the controlled reload and refill quantity of solid reactant into the reaction chamber, 1, the piston, 60, being stopped by the collar, 72, when the end is flush with the surface, 71. A preferred removal means, for use with the refill means of FIGS. 6 and 7, functions to remove whatever volume is forced into the removal means during the above described refill process with the removal process following the refill process. Control of refill quantity by adjustment of the cavity block, 68, via the control link, 69, can be done by hand or by an automatic control means.

One example scheme for adjusting the solid reactant flow rate via adjustment of the removal quantity is shown partially in FIG. 13 and comprises the removal piston stop, 73, secured to the threaded adjustment bar, 74. Rotation of the threaded bar, 74, by the wheel, 75, as by hand or automatically moves the stop, 73, so as to adjust the stroke and hence displacement of the removal piston, 76. For the refill and removal means shown in FIG. 13 refill process and removal process take place concurrently and refill displacement equals or exceeds removal displacement so that the removal piston is always forced during a removal process against the stop, 73. In this way, the removal quantity is adjusted by adjusting the stop, 73, and refill quantity is also adjusted since the refill means of FIG. 13 fully refills the reaction chamber on each refilling process.

The refill interval can be adjusted by adjustment of the means for setting the refill interval, as by hand, or by changing the set value of sequences or cycles to which an automatic means for setting counts up before initiating the refill drive means to carry out a refill process. The removal interval can be made similarly adjustable. Details of example means for setting refill interval and removal interval and for adjusting these intervals will be described hereinbelow. Ordinarily, the refill interval and removal interval are adjusted in steps of an integral number of sequences or, were a group valve is used, an integral number of batches of groups of sequences. Hence, a fine control of solid reactant flow rate cannot usually be exercised by adjustment of refill or removal interval. For this reason, both a quantity control scheme and an interval control scheme may be preferred in some applications where, for example, coarse control of solid reactant flow rate is made by adjustment of refill interval and fine control is made by adjustment of refill quantity.

IV. Drive means and control means:

Drive means are needed which, upon each initiation by a control means, are to drive various mechanisms through a single process such as: the delivery means; the discharge means, the refill means; the reload means if required; the removal means; the admission means; the group selector valves. Various kinds of drive means, mechanical, electrical, pneumatic, hydraulic, combination, can be used for these purposes of this invention. Preferably, a drive means completes its single driving process within one cycle of rthe compressor means after initiation, although a few consecutive cycles can be used for carrying out a refill process or a removal process. Several cycles can be used for a reload process provided they are fewer than the number of cycles in a refill interval. Thus, the drive means used for this invention function to carry out a single driving process rather quickly and are then idle until next initiated by the control means.

Various kinds of control means can be used for the purposes of this invention such as: hand control and initiation; automatic control of mechanical or electrical or pneumatic or combination type. The control means can function by counting cycles, or sequences or groups or batches up to a set value and then initiating the drive means and also resetting itself to start counting again. Even hand control comprises these same functions wherein the operator counts compressor cycles, either directly or by measured time intervals, and then hand initiates the drive means before starting again to count cycles. Thus, each control means comprises a counting means, an initiator means, and a resetting means, and in some cases a means for adjusting the set value of counts.

The number of cycles in a sequence, the number of sequences in a group, the number of groups in a batch, the number of batches or sequences or cycles in a refill interval, and the number of batches or sequences or cycles in a removal interval are all finite integral numbers other than zero. It is thus possible to have a single compressor cycle be a refill interval, a removal interval, and a batch of groups of sequences. The number of crankshaft revolutions or the number of volume decrease-volume increase cycles occurring in one batch equals the sum of the number of compression-expansion cycles in all sequences of the batch plus the number of cycles utilized for discharge and delivery processes.

One illustrative example of a mechanical drive means and control means suitable for use as a refill drive means, as a removal drive means, as a reload drive means, as a delivery or discharge drive means, as a group valve drive means, etc., is shown schematically in FIG. 14 and also in FIG. 15, which is a cross section view taken from FIG. 14 as indicated thereon. A drive cam, 146, is driven, as by gears or chains, at compressor crankshaft or camshaft speed about the centerline, 147, with base circle radius, 148, in the direction, 149, and its lifting section, 150, acts on the primary drive cam follower, 151. When the moveable drive cam follower, 152, is engaged to the primary drive cam follower, 151, as shown in FIGS. 14 and 15, the moveable drive cam follower, 152, acts upon the secondary drive cam follower, 153, which in turn acts via the connection, 154, to drive the connected mechanism through a single process. The moveable drive cam follower, 152, is pivoted about the centerline, 155, and is moveable along this centerline as a means of engaging and disengaging the moveable drive cam follower, 152, to and from the primary drive cam follower, 151. As shown in FIG. 14, the connected mechanism will be driven through a single process as the lifting section, 150, of the drive cam, 146, passes the primary drive cam follower, 151, return motions being secured by the return springs, 156, and 157. Engagement and disengagement of the moveable drive cam follower, 152, to and from the primary drive cam follower, 151, can be carried out by the interval cam, 158, shown in FIG. 15, which is rotated about the centerline, 159, at a speed reduced from the speed of the drive cam, 146, as by gears or chain drive, in the direction, 160, with base circle radius, 161. The lifting section, 162, of the interval cam, 158, acts on the interval cam follower, 163, to lift the moveable drive cam follower, 152, into engagement with the primary drive cam follower, 151, and is shown in this position in FIG. 15. When, however, the interval cam follower, 163, is returned by the return spring, 164, back on to the interval cam base circle, 161, the moveable drive cam follower, 152, is in the dashed outline position, 165, and is there disengaged from the primary drive cam follower, 151, and in this position the connected mechanism is thus not acted upon by this drive means. The angular position and angular extent of the lifting section, 162, of the interval cam, 158, are selected to insure that engagement of the primary drive cam follower, 151, is to occur within a single revolution of the drive cam, 146, and only when the primary drive cam follower, 151, is on the base circle, 148, of the drive cam. These timing arrangements, together with the stop, 166, on the secondary drive cam follower, 153, assure that such engagement and disengagement can occur without mechanical interference and that only a single process of the mechanism takes place. The drive means shown in FIGS. 14 and 15 can be used as a single cycle drive means or as a multicycle drive means with the cam lifting sections differing. Where the process is to be carried out only during a single compressor cycle the lifting section, 158, of the drive cam, 146, is timed accordingly, and for this purpose we prefer to drive the drive cam, 146, at compressor crankshaft speed or the equivalent for non piston and cylinder compressor means. Return motions are spring actuated in FIGS. 14 and 15 but positive return motion can alternatively be used via separate positive return drive or via captured cam followers. Since engagement of the moveable drive cam follower, 152, to the primary drive cam follower, 151, constitutes initiation of the drive means of FIG. 14, the interval cam, 158, and mechanism of FIG. 15 are a portion of the mechanical control means. For example, the number of cycles intervening between drivings of the connected mechanism by the drive means of FIG. 14 can be set by setting the speed ratio between the drive cam, 146, and the slower interval cam, 158. Once this speed ratio is set, the interval is set and the counting and resetting portions of the control means of FIG. 15 is the speed reducer gear or chain drive between the drive cam, 146, (or compressor crankshaft) and the interval cam, 158.

The solenoid actuated initiator means shown in FIG. 16 can be substituted for the mechanical initiator means shown in FIG. 15 to initiate the mechanical drive means of FIG. 14. Energizing the solenoid, 167, moves the moveable drive cam follower, 152, into engagement with the primary drive cam follower, 151, and deenergizing the solenoid, 167, allows the spring, 168, to disengage the moveable follower from the primary follower at the position, 165. In this way, an electric signal to the solenoid, 167, can function to initiate the mechanical drive means of FIG. 14 which operates otherwise as described hereinabove.

An illustrative example of several electrical control means combined together for control of the following is shown schematically in FIG. 17:

a. control of the number of cycles in each sequence;
b. control of the number of sequences in each delivery group of sequences;
c. control of the number of sequences in each discharge group of sequences;
d. control of the number of batches of delivery groups of sequences in each refill interval;
e. control of the number of batches of delivery groups of sequences in each removal interval;
f. selection of the admission cycles;
g. control of admission time during admission cycles to commence after compression starts and to cease before expansion ends.

These combined electrical control means comprise the following elements and functions:

1. a pressure sensor, 169, responds to pressures within the cylinder, 7, of the compressor means and sends an electric pressure signal to the cycles counter means, 170, and also to the cycle timer means, 171, for the admission means;
2. a cycles counter means, 170, which counts the cycles of compression and expansion by counting the number of pressure rise and fall cycles of fthe pressure signal from the sensor, 169, and when the cycles count reaches a set value energizes a solenoid, 172, which initiates a discharge process of the compressor means, as, for example, by opening the valve, 21, via the lever, 173, of the discharge means, 13, 21, shown in FIG. 1, wherein the valve, 13, is operable on every cycle as a compressor discharge valve;
3. a delivery process initiator means, 174, actuated, for example, by the compressor discharge valve, 13, which, when a single discharge process is completed after initiation, initiates a single delivery process as by energizing the solenoid, 175, which opens the valve, 20, via the lever, 176, of the delivery means, 10, 20, shown in FIG. 1, wherein the valve, 10, is operable on every cycle as a compressor delivery valve; and deenergizes the solenoid, 172, to end the discharge process;
4. a cycles counter resetter means, 177, actuated, for example, by the compressor delivery valve, 10, which, when a single delivery process is completed after initiation resets the counter means, 170, to start counting cycles again for the next following sequence of cycles and also sends a sequence count signal to the delivery group sequences counter means, 178, and also to the discharge group sequences counter means, 179, and deenergizes the solenoid, 175, to end the delivery process;
5. a delivery group means for counting sequences, 178, which counts the sequences completed signals from the cycles counter resetter, 177, and when the sequences counts reaches a set value, initiates the delivery group valve drive means as by energizing the solenoid, 180, of the group valve drive means shown in FIGS. 8, 9, 10, to move the delivery sector valve on to the next inlet port and thus to commence the next delivery group in the inlet order of connections;
6. a delivery group counter resetter means, 181, which can be the same as the reset switch, 100, of FIG. 10, which when the delivery group valve drive means has moved the group selector valve on to connect to the next inlet port in the inlet order of connections, resets the group counter means, 178, to start counting sequences again for the next group;
7. the delivery group means for counting sequences, 178, may also count completed batches, as by counting groups or by counting the number of full revolutions of the delivery selector valve of FIG. 8, and each such batch completed signal is sent on to a refill batches counter means, 182, and a removal batches counter means, 183;

8. alternatively, and not shown in FIG. 17, the delivery group counter resetter means, 181, can function to send a group completed signal on to a refill groups counter means, 182, and a removal groups counter means, 183, and in these ways the refill interval and the removal interval can each be set to a set value of delivery batches or to a set value of delivery groups;

9. a discharge group means for counting sequences, 179, a discharge group valve drive means initiator, 187, and a discharge group counter resetter means, 188, can function to drive the discharge group selector valve through its outlet order of connections and for repeating this outlet order of connections in the same manner as for the driving of the delivery group selector valve through its inlet order of connections as described above;

10. the number of sequences in each group may be fixed and the same for each group by using a fixed set value of sequences counts in the delivery group sequences counter, 178, and in the discharge group sequences counter, 179, or alternatively these set values of sequences per group can be adjusted in integral steps, as by hand or automatically, via set value adjustors, 197, 198, and when only one such set value is used all groups are of the same number of sequences;

11. alternatively successive groups can be of differing numbers of sequences wherein the set value of sequences counts may be changed upon completion of each group and this pattern of group number of sequences is repeated for each batch of groups;

12. a refill batches counter means, 182, which counts completed batches and when the batches counts reaches a set value initiates the refill means drive means as by energizing the solenoid, 167, of the electrical initiator means shown in FIG. 16, which initiates the drive means shown in FIG. 14, to drive the refill means through a refill process;

13. a refill counter means resetter means, 184, actuated, for example, by a portion of the refill means which, upon completion of a single refill process after initiation, resets the refill batches counter means, 182, to start counting batches again for the next following refill interval and also simultaneously deenergizes the solenoid, 167, of the refill drive means initiator of FIG. 16;

14. a removal batches counter means, 183, and a removal drive means initiator, 185, and a removal counter means resetter, 186, can function to set the removal interval in the same manner as refill interval is set as described above;

15. the refill counter means, 182, and the removal counter means, 183, are shown in FIG. 17 as responding to delivery batches completed counts so that refill interval and removal interval are set in integral values of number of delivery batches completed, but one or both of these intervals could alternatively be set in integral values of number of discharge batches completed, and this counts signal would then come from the discharge group means for counting sequences, 179;

16. refill interval and removal interval are in effect always set in integral values of number of cycles, but this number of cycles can be counted directly as cycles, or as numbers of sequences, or as number of batches;

17. the set value of refill interval can be adjusted in integral steps, as by hand or automatically, via a set value adjustor, 195, on the refill counter means, 182, and the removal interval can be similarly adjusted via a set value adjustor, 196;

18. a cycle timer means, 171, which, when the compression pressure rises to a cut in value sends power from the power source, 189, on to the cycles selector means, 190, and also when the expansion pressure drops to a cut out value stops the power from the source, 189, and in this way the pressure sensor actuated cycle timer means, 171, of FIG. 17 assures that admission starts only after compression has started and ends before expansion has ended;

19. a cycle selector means, 190, which receives a sequences counts signal from the delivery group means for counting sequences, 178, and passes on the power from the cycle timer means to the solenoid, 191, thus opening the admission valve, 102, during only those delivery sequences selected to have admission of additional reactant gas thereto, and in this way the cycle selector means assures that admission occurs only during the selected sequences;

20. where admission of additional reactant gas is to occur into only selected cycles of the selected sequences, the cycles selector means, 190, receives also a signal from the cycles counter means, 170, and this signal is not shown in FIG. 17, and passes on the power to the solenoid, 191, during those cycles selected to have admission, and in this way the cycle selector means can assure that admission occurs only during the selected cycles of the selected sequences;

21. as shown in FIG. 17 the cycles selector means, 190, selects sequences from among the delivery sequences counted by the delivery group sequences counter, 178, and this will usually be preferred, but in some cases it may be preferred that the cycles selector means, 190, select sequences from among the discharge sequences, and in this case the sequences counts signal input to the selector means, 190, will be from the discharge group sequence counter, 179;

22. where admission of additional reactant gas is to occur into only selected cycles and independently of sequences, the cycles selector means, 190, selects cycles for admission from among those counted by the cycles counter means, 170, and a sequences counts signal is not used;

23. the cut in pressure value can be made adjustable, as via a hand adjustment, 192, and the cut out pressure value can also be made similarly adjustable via the knob, 193, and in this way the portion of each admission cycle during which admission of additional reactant gas occurs can be adjusted;

24. needed electrical power is supplied to the several counters, initiators, and actuators, etc., of FIG. 17 via power sources, 189;

25. a pressure sensor, 169, is used in FIG. 17 for counting cycles of compression and expansion but a compressor shaft revolutions sensor could be substituted as a cycles counting sensor;

26. the pressure sensor, 169, is also used in FIG. 17 as a cycle timing input to the cycle timer means, 171, but a crank angle sensor could be substituted as a cycle timing sensor;
27. electrical sensors, counters, initiators, resetters, etc. are shown in FIG. 17, but analogous mechanical sensors, counters, initiators, resetters, etc. can alternatively be used and driven directly as from the compressor crankshaft;
28. the sequence length in number of cycles per sequence can be fixed with a fixed value of the set value of counts to which the cycles counter means, 170, counts cycles before ending a sequence by initiating a discharge process followed by a delivery process, as described above, or alternatively the set value of sequence length can be adjusted in integral steps, as by hand, via a set value adjustor, 194, and when only one such set value is used all sequences are of the same length and this pattern of sequences lengths of all being equal is then repeated for each group of sequences and for each batch of groups;
29. alternatively, successive sequences can be of different lengths in a pattern of sequences lengths wherein the set value of cycles counts may be changed upon completion of each sequence, and this pattern of sequences lengths can be repeated for each group of sequences, or, alternatively again, can be repeated for each batch of groups of sequences;
30. where the pattern of sequences lengths is to be repeated for each group, a group completed signal for thusly repeating can be sent from one or the other of the delivery group means for counting sequences, 178, or the discharge group means for counting sequences, 179;
31. where the pattern of sequences lengths is to be repeated for each batch, a batch completed signal for thusly repeating can be similarly sent also from the delivery group counter, 178, or the discharge group counter, 179;
32. the control means of FIG. 17 is a combined control means wherein the several control means interact with each other, but entirely separate and independent control means can be used, one for each control function;
33. details of the various sensors, counters, actuators, resetters, etc. for these above-described control means are not described herein as being already well known in the art of electrical, electronic, mechanical, pneumatic, and hydraulic control means;
34. the various set values for the various counters can also be automatically adjustable, for example, sequence length can be adjusted to increase automatically as extent of reaction of first reactant gas decreases as sensed by analysis of discharged gases;
35. direct counting of cycles is described above as by pressure sensor signals or by shaft revolution sensor but where compressor cycles per unit of time are constant a clock can also be used as a cycles counter.

The delivery valve, 10, and the discharge valve, 13, shown in FIG. 1 can be driven via the linkages, 199, 200, as by cams on the compressor crankshaft, 201, so that discharge valve, 13, opens only during all volume decreasing strokes of the piston, 6, and so that delivery valve, 10, opens only during all volume increasing strokes of the piston, 6. In this way, the opening and closing of the series delivery valve, 20, and the series discharge valve, 21, determine which of the piston strokes are delivery processes and which are discharge processes, whereas the valves, 10, 13, set the proper timing of delivery and discharge relative to the motion of the piston, 6. One alternative to the mechanically driven valves, 10, 13, shown in FIG. 1 is pneumatically driven valves such as the common disc type valves used in compressors. Instead of using two delivery valves in series and two discharge valves in series as described above and as shown in FIG. 1, a single delivery valve and a single discharge valve can be used and these can be driven by a drive means initiated by the cycles counter means and its initiator means, such as the mechanical scheme shown in FIGS. 14 and 15, or the mechanical-electrical scheme shown in FIGS. 14, 16, and 17.

Where hand initiation of one or more drive means is to be used, this can be done in various ways as, for example, the following:

(a) the solenoid, 167, of FIG. 16 can be omitted or disconnected and the moveable drive cam follower, 152, engaged by hand and disengaged by the spring, 168, with a recess preferably put into the moveable follower, 152, so that this moveable follower is held engaged by indexing of the primary drive cam follower, 151, into the recess through one full drive process after which the moveable follower, 152, is released from the primary follower, 151, and disengaged by the spring, 168;

(b) the switch, 97, of FIG. 10, can be omitted and replaced with a hand-operated switch for initiating the group valve drive means shown in FIGS. 9 and 10.

Other kinds of drive means can be used instead of the illustrative drive means described hereinabove and some of these alternate drive means are described in the cross referenced applications. For example, the refill means and the removal means shown in FIG. 2 can be driven by pneumatic-mechanical drive means such as described in my cross referenced application, "Char Burning Free Piston Gas Generator," Ser. No. 264105, now issued as U.S. Pat. No. 4,372,256, on FIGS. 1, 4, 5, 10, 11, 12 therein and on page 21 line 17 through page 27 line 29 in the application with the valve, 74, functioning as the initiator for this drive means, and this material from this application Ser. No. 264105 now issued as U.S. Pat. No. 4,372,256, is incorporated herein by reference thereto.

V. Combinations of several cyclic solid gas reactor machines

A cyclic solid gas reactor plant may comprise one or several cyclic solid gas reactor machines wherein all machines in a single plant utilize the same solid reactants and the same reactant gases. Where but a single first reactant gas is utilized and no or but one single additional reactant gas is admitted during all compression expansion cycles, all cyclic reactor machines in a multimachine cyclic reactor plant, will be forming the same gas products. For this particular case, gas product formation is essentially steady as between compression expansion cycles and any non zero integral number of machines may be used in combination in such a plant without appreciably affecting the steadiness of net gas product formation except as discharge and delivery processes can be staggered for the several machines relative to each other.

Unsteady gas product formation as between compression expansion cycles results when one or more of the following conditions prevail for a single cyclic solid gas reactor machine.

a. two or more different first reactant gases are used with delivery group valves;
b. two or more different additional reactant gases are admitted and during different admission cycles with an admission selector valve;
c. only one additional reactant gas is admitted but not during all compression expansion cycles.

The gas product formation can be made essentially steady for these example cases by using a sufficient number of such machines in combination in a single plant and timing them relative to each other so that the number of machines operating with each different combination of first reactant gas and additional reactant gas remains constant. Where no or but one additional reactant gas is admitted during all compression expansion cycles, the preferred least number of machines for steady product formation, n, equals the total number of cycles in all sequences of all groups in a delivery batch of groups of sequences plus the number of cycles utilized for discharge and delivery processes during one batch. Since each cyclic solid gas reactor machine comprises a single compressor means, this least number of machines, n, is also the least number of compressor means for steady product. The total number of compressor means for steady product, N, can then be given by the following equation:

$$N = I(n)$$

Wherein I is a non zero integer and is herein named the integer for the number of compressor means. The least number of machines, n, and the total number of machines, N, for steady product can be calculated using the above equations for cases where one or more additional reactant gas is admitted via admission means provided that the pattern of admissions cycles is repeated for each batch of groups of sequences, as will commonly be the case.

Each compressor means will preferably have its own delivery group valve whose outlet connects to the first reactant gas inlet pipe of only that one compressor means.

Where the gas products formed are to be kept separated after discharge from the compressor means, discharge group valves are needed. Preferably each compressor means will have its own separate discharge group valve whose inlet connects to the product gas output pipe of only that one compressor means.

For full separation of different gas products formed from different first reactant gases, the discharge group valve is to change its selector valve outlet port connection at the same time that the delivery group valve changes its selector valve inlet port connection and relative timing means are thusly needed between the delivery group valve drive means and the discharge group valve drive means connected to the same compressor means. The simplest such relative timing means for this case is to use a single common drive means to simultaneously drive both the delivery group valve and the discharge group valve connected to the same compressor means.

Where the gas products formed are not to be kept separated after discharge from the compressor means, discharge group valves are not needed.

For full separation of different gas products formed from one or more first reactant gases and one or more additional reactant gases, the discharge group valve is to change its selector valve outlet port connection whenever; a change occurs in the delivery group valve inlet connection, or the admission means commence delivery of additional reactant gas to admission cycles, or the admission means ceases delivery of additional reactant gas to cycles, or a change occurs in the admission selector valve inlet connection. Hence, relative timing means are needed for this purpose between the delivery group valve drive means, the discharge group valve drive means, the admission delivery means drive means and the admission selector valve drive means which connect to the same compressor means. Various kinds of mechanical, electrical, etc. relative timing means can be used. Where the pattern of admissions cycles is repeated for each batch of groups selector valves connected in series can be used as follows:

(a) a first discharge selector valve operating and being timed as described hereinabove for the case of full separation of gas product formed from different first reactant gases;

(b) secondary selector valves on those outlet ports of the first discharge selector valve through which is passed product gas formed from a first reactant gas and also an additional reactant gas, these secondary selector valves being driven to change their outlet port connection whenever the admission means commences delivery to admission cycles and also whenever the admission means ceases delivery to cycles;

(c) tertiary selector valves on those outlet ports of each secondary selector valve through which is passed product gas formed from a first reactant gas and two or more additional reactant gases, these tertiary selector valves being driven to change their outlet port connection whenever the admission selector valve changes its inlet connection.

Alternatively, a number of separate solenoid valves, equal to the number of different product gases formed, can be used as a discharge group valve with each such valve connecting from the compressor product gas output pipe to a separate product gas collector means, similar to the scheme shown in FIG. 12. An electrical control can then be used to open and close these solenoid valves so that but one valve is open at any one time and so that the different product gases are separated into different product gases collector means.

The total number of compressor means for steady product, N, are then to be timed relative to each other so that the number of compressor means operating with each different combination of first reactant gas and additional reactant gas remains constant while any one compressor operates with different reactant gas combinations from one group or sequence to the next. Various means can be used for timing the several compressor means relative to each other, of which the simplest is to drive all compressor means of the plant from the same shaft and to achieve the desired relative timing mechanically. The example cyclic solid gas reactor plant shown schematically in FIG. 18 will illustrate mechanical relative timing methods. The example plant of FIG. 18 is intended to carry out a solid gas reaction using two different first reactant gases, A and B, with first reactant gases A and B being each delivered for one sequence of two cycles per batch and with two cycles per batch used for discharge and delivery processes. Hence, a batch of delivery groups of sequences of cycles plus associated discharge and delivery processes requires six cycles so that six compressor means are the minimum for steady product formation as is shown in FIG. 18. Six piston and cylinder compressor means, 202, 203, 204, 205, 206, 207, are shown in FIG. 18 and these are powered by a common crankshaft, 208, with separate crank throws, 209, 210, 211, 212, 213, 214, respectively. For the minimum number case of FIG. 18 three crank throws, 208, 212, 214, are at the same angle and the other three crank throws, 210, 211, 213, are together at 180 degrees from these so that only two product discharge and delivery processes can take place concurrently on each crank revolution as required for steady product formation. In general, the crank throws will be thusly set apart at 180 degrees when the minimum number of compressor means is used in a plant. Where the integer for the number of compressor means is two, one-half of these compressor means crank throws are preferably set at 90 degrees to the crank throws of the other half. In general, the crank angle between crank throws preferably equals 180 degrees divided by the integer for the number of compressor means.

A cyclic solid gas reactor plant with steady product formation as between cycles will be preferred in those applications where a steady flow of gas reactants into the plant or a steady flow of gas products out of the plant or a steady power output or input are desired. Product formation and power necessarily vary during a single cycle of a cyclic reactor. These in-cycle variations of gas flow can be accommodated by use of gas holder tanks. These in-cycle variations of power can be reduced by use of a flywheel, 215, on the common shaft of the several compressor means. Usually, the power means portions of the several compressor means are combined into a single common power means, 216.

VI. Capacity and sizing

An example reaction process for a cyclic solid-gas reactor can be written as follows:

$$(S)+(FG)+(AG)=(NG)+(GP)+(QRF)+(QRA)$$

This represents a solid reactant, (S), first reactant gases, (FG), and added reactant gases, (AG), reacting to form non gas products, (NG), and gas products, (GP), with evolution of reaction heat due to the first reactant gas reaction, (QRF), and evolution of reaction heat due to the added gas reaction, (QRA). The relative proportions of reactants to one another and to the products are fixed by the reaction stoichiometry where reaction is essentially complete, and by stoichiometry plus extent of reaction where reaction is significantly incomplete. These relative proportions can be expressed as follows from the mass balance between reactants and products:

$$1 + \frac{(WS)}{(WFG)} + \frac{(WAG)}{(WFG)} = \frac{(WNG)}{(WFG)} + \frac{(WGP)}{(WFG)}$$

Wherein the preletter W signifies the weight of reactant going into the reactor and the weight of product going out of the reactor per batch of groups of sequences of cycles. Where reaction is significantly incomplete, the product ratios can be expressed as follows:

$$\frac{(WGN)}{(WFG)} = \frac{(WS)}{(WFG)} + (e - he) + \frac{(WAG)}{(WFG)}(f - kf)$$

-continued $$\frac{(WFG)}{(WFG)} = (1 - e + he) + \frac{(WAG)}{(WFG)}(1 - f + kf)$$

Wherein the extent of reaction factors are as follows:
  e=fraction of FG reacted into NG product
  f=fraction of AG reacted into NG product
  h=GP formed from S per unit of FG reacted
  k=GP formed from S per unit of AG reacted These extent of reaction factors, e, f, h, k, can be determined from pilot plant experiments and data. In some cases where the reaction speed relations are well known, these extent of reaction factors may perhaps be calculated for a cyclic reactor by integrating the reaction speed relation through each cycle of each sequence of each group.

In the majority of solid to gas reactions, the extent of reaction is increased by the higher temperatures and higher gas reactant concentrations resulting from use of higher values of compression ratio, CR, of the compressor means. The extent of reaction is additionally increased at higher compression ratio by the consequently increased product gas purge removal during expansion. Maximum useable compression ratios are commonly limited by mechanical stress capability of the compressor means or by occurrence of unwanted side reactions at higher pressure and temperatures.

The extent of reaction of the gaseous reactants is increased by increasing the number of cycles in each sequence of a group. The extent of reaction of the solid reactants is increased by increasing the number of sequences in a group. The number of groups per batch is, of course, set by the number of different kinds of first reactant gas to be delivered into the cyclic solid gas reactor. Thus, the pilot plant data will also show the preferred pattern of each batch as the number of groups per batch, the number of sequences in each group and the number of cycles in each sequence. The total number of cycles in all of the sequences of a batch, (b), and the total number of cycles used for discharge and delivery processes, (a), in one batch, which equals the number of sequences in a batch, can be added together, (b+a), to determine the total number of cycles in a batch.

The compressor displacement required for a selected reactor capacity or the capacity of a given reactor plant can be estimated from the following approximate relations:

$$(WFG)=(VD)(nv)(df)(a)$$

Wherein (VD) is the displacement volume of a single compressor means, (nv) is the volumetric efficiency of the compressor means, and (df) is the delivery density of the first reactant gas.

$$(bph) = \frac{(cpm)(60)(N)}{(b + a)}$$

Wherein (bph) is the batches per hour rate, (cpm) is the cycles per minute for one compressor means, (N) is the number of compressor means in the cyclic reactor plant. For cyclic reactor plants with steady formation, $(N)=(I)(n)=(I)(b+a)$, and hence:

$$(bph) \text{ steady} = (I)(cpm)(60)$$

Wherein (I) is the integer for the number of compressor means.

The total weight quantities per hour of reactants and products can then be calculated as the product of the batches per hour times the weight per batch, as for example:

(Total weight of solid reactant per hour)$=(WS)(bph)$

Precompression of the first reactant gas, as by use of a turbosupercharger, not only increases plant capacity by increasing (df) but also increases extent of reaction by increasing temperatures and concentrations of the first reactant gas. Preheat of the reactant gases usually increases reaction speed but reduces plant capacity by reducing delivery gas density, (df).

Reaction chamber volume, (VR), can be determined from the definition of compression ratio, CR:

$$(CR) = 1 + \frac{(VD)}{(VC)}$$

$$(VC) = (VR)(pf) + (VF)$$

Wherein (VC) is the total gas volume when the compressor piston is at the minimum compressed volume position, (pf) is the pore volume fraction of the non gas material of the reaction chamber, (VF) is the free volume portion of (VC) which is never occupied by non gas material. The value of (pf) can be approximated as the average of the values for fresh solid reactant and for removed non gas product or can be determined by pilot plant experiment. The free volume, (VF), is usually set as small as allowed by requirements of mechanical clearance which can be roughly (0.02)(VC) to about (0.10)(VC). Alternatively, where it is desired to react product gases emerging from the pore spaces with a portion of fresh reactant gases, the value of (VF) can be increased as a retainer of reactant gases outside the reaction chamber for this later reaction during expansion processes.

Residence time, (TR), of non gas material within the reaction chamber, in number of batches, can usually be approximated with the following relation:

$$(TR) = \frac{2(VR)}{\left[\frac{(WS)}{(dS)} + \frac{(WNG)}{(dNG)}\right]}$$

Wherein (dS) is the density of the fresh solid reactant refilled and (dNG) is the density of the non gas products removed from the reaction chamber.

The working volume of the removal means, (RMV) can be estimated in terms of the removal interval (qNG) as follows:

$$(RMV) = (qNG)\frac{(WNG)}{(dNG)}$$

Wherein removal interval, (qNG), is expressed in number of batches. Similarly, the working volume of the refill means, (RV), can be estimated in terms of the refill interval, (qS), in number of batches, as follows:

$$(RV) = (qS)\frac{(WS)}{(dS)}$$

Commonly the reload means working volume will equal the working volume of the refill means.

Power means capacity, PMC, can be estimated from the following approximate relations:

$$(Wk) = (bph)(QR)(et)$$

$$(WR) = e(WFG)(QRF) + f(WAG)(WRA)$$

Wherein:
(Wk)=net process work, energy units per hour
(QR)=net heat of reaction released per batch, energy units
(QRF)=heat of reaction per unit mass of first reactant gas reacted, energy units
(QRA)=heat of reaction per unit mass of additional reactant gas reacted, energy units
(et)=fractional work thermal efficiency of the process The work thermal efficiency, (et), can be approximated in terms of the ideal Otto cycle efficiency as follows:

$$(et) = (0.60)\left[1 - \frac{1}{(CR)^{S-1}}\right]$$

Wherein S is the ratio of specific heat at constant pressure divided by the specific heat at constant volume for the expansion gases.

$$(PMC) = (Wk) - (FW);$$

in energy units per hour
Wherein (FW) is the friction work per hour required to drive the compressor means and auxiliaries in the absence of any net heat of reaction and is thus the friction work loss.

For endothermic reactions, (QR) and (Wk) are negative, and the power means capacity (PMC), being negative requires a drive motor of at least the indicated capacity. For exothermic reactions, (QR) and (Wk) are positive, and if (Wk) exceeds (FW), a net work output, (PMC), results and the power means requires to have at least this power absorbing capacity. In addition, for exothermic as well as thermoneutral reactions, the power means requires to be capable of running as a drive motor, of at least FW capacity, for the startup of the cyclic solid gas reactor.

The various capacity and sizing relations herein require only that consistent units be used throughout.

VII. Example application

The cyclic solid gas reactors of this invention can be used to carry out efficiently many kinds of chemical reactions, such as the iron ore reduction reaction described hereinabove. An additional example, to illustrate the use of this invention, is the water gas reaction of steam with coke to produce a high heating value gas fuel:

$$H_2O + C = CO + H_2$$

This water gas reaction requires that the solid carbon be at a high temperature (circa 1200° F. to 1500° F.). But the reaction is strongly endothermic so it is necessary to heat up the carbon first, as by a producer gas reaction, followed by the above water gas reaction with the result that the carbon is periodically heated up by the producer gas reaction and then cooled down by the water gas reaction. Prior art water gas generators carry out this cyclic reaction in fixed volume retorts at essentially constant and low pressure and utilize very little of the pore area available in the solid coke and do not recover mechanical work from the producer gas reaction.

A cyclic solid gas reactor of this invention would use a delivery group valve with two first reactant gas sources, one for air for the producer gas reaction, and one for steam for the water gas reaction. A discharge group valve would also be used with two product gas collector means, a producer gas collector connected when the producer gas reaction is occurring, and a water gas collector connected when the water gas reaction is occurring. Though not necessary, it may be desirable to admit steam as an additional reactant gas during the producer gas reactions in order to enrich the resulting producer gas and also to limit the maximum temperatures reached by the solid carbon. For this purpose, a steam admission means can be used to admit steam, separately from the air, during all or some of the producer gas reaction cycles. Although essentially all of the solid carbon reactant is gasified a removal means is nonetheless required in order to remove ashes. The delivery and discharge group valves change connections simultaneously so a common drive means can be used for both group valves.

A batch thus contains two groups of sequences. The producer gas sequences may be made very short and perhaps need be of only one cycle each. The water gas sequences, however, are preferably made sufficiently long that essentially all steam is fully reacted before discharge of product gas. By thus fully reacting the steam reactant the undesirable water gas shift reaction is suppressed since there is little or no steam available for this shift reaction.

Although the producer gas reaction is exothermic and will thus produce a work output, the water gas reaction is endothermic and will require a work input. Thus, by adjusting the relative durations of the producer gas reaction and the water gas reaction the net work can be in principle adjusted from a work input to a work output. For a sustained cyclic reaction, requiring the solid carbon to remain always above the rapid reaction temperature, the producer gas reaction work output roughly equals or slightly exceeds the water gas reaction work input. But net work output can always be increased by increasing the duration of the producer gas reaction relative to the water gas reaction.

In comparison with prior art water gas fixed volume retort reactors, the cyclic solid gas reactors of this invention offer the following advantages:

1. a net work output can be obtained from the reactor if desired;
2. the water gas shift reaction can be suppressed;
3. a more rapid reaction results from the use of interior areas of the pores in the solid coke reactant.

These examples of the uses of the cyclic solid gas reactors of this invention are for purposes of illustration and it is not intended thereby to limit the invention to these example uses since many kinds of solid to gas reactions can be efficiently carried out in the reactors of this invention. Similarly, it is not intended to limit the invention to the specific forms of the elements described herein for purposes of illustration since several different forms of many of the separate elements can be used for the reactors of this invention.

Having thus described my invention, what I claim is:

1. A cyclic reactor plant for contacting at least one solid reactant with at least one gas reactant and comprising at least one cyclic reactor machine, said cyclic reactor machine comprising:

at least one separate solid reactant supply sources;

at least one separate first reactant gas supply sources;

at least one reaction chambers, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:

means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating, and so that each said sequence of cycles is followed by a delivery process and so that each said delivery process is followed by the next sequence of cycles of compression and expansion;

power means for driving said compressor and for absorbing any power output; means for sealing said delivery means during all compression and expansion processes; means for connecting said compressor means into said reaction chambers; means for connecting said first reactant gas inlet pipe at outlet to said means for delivering;

reactant supply means for connecting the inlet of said first reactant gas inlet pipe of said compressor means to said first reactant gas supply source;

at least one refill means for adding fresh solid reactant at intervals into each of said containing means via said refill end thereof, said interval being the refill interval, said adding of solid reactant being a refill process, each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating, means for sealing said refill end of each of said containing means during compression and expansion processes;

at least one reload means for reloading fresh solid reactant from at least one solid reactant supply source into each of said refill means after each refilling is completed, so that any one said containing means is refilled with solid reactant from the same at least one of said solid reactant supply sources, and so that from each of said number of solid reactant supply sources refilling occurs into at least one of said containing means;

at least one removal means for removing non-gas products from each of said containing means via said removal end thereof, and for sealing said removal end of each of said containing means during said compression and expansion processes, and for dumping said removed products outside said cyclic reactor machine;

means for setting said refill interval by setting the number of cycles in each refill interval operative upon said means for initiating said refill drive means of said refill mechanisms so that each said refill means is driven through a single refill process for adding fresh solid reactant into said containing means, at the end of said refill interval;

sequence means for setting the number of cycles in each sequence of cycles of compression and expansion operative upon said means for initiating said means for delivering so that a delivery process is carried out at the end of each said sequence of cycles, said sequence means comprising; a cycles counter means for counting cycles, an actuator means operative upon said means for initiating said means for delivering so that a delivery process is carried out when said cycles counts equal a set value of cycles counts, means for resetting said cycles counter means to start counting cycles again next after each said delivery process is completed with said set value of cycles counts being at least two for at least one sequence.

2. A cyclic reactor plant for contacting at least one solid reactant with at least one gas reactant and comprising at least one cyclic reactor machine, said cyclic reactor machine comprising:

at least one separate solid reactant supply sources,
at least one separate first reactant gas supply sources;
at least one separate product gas collector means;
at least one reaction chambers, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:

means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

a product gas output pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating;

means for discharging gases out of said compressor means into said inlet of said product gas output pipe, such discharge being a discharge process and comprising means for initiating said means for discharging gases so that a single said discharge process is carried out by said means for discharging gases whenever initiated by said means for initiating, and so that each said sequence of cycles is followed by a discharge process and each said discharge process is followed by a delivery process and so that each said delivery process is followed by the next sequence of cycles of compression and expansion;

power means for driving said compressor and for absorbing any power output; means for sealing said discharge means during all compression and expansion processes and essentially all of each delivery process of said compressor means; means for sealing said delivery means during all compression and expansion processes and essentially all of each discharge process of said compressor means; means for connecting said compressor means into said reaction chambers; means for connecting said first reactant gas inlet pipe at outlet to said means for delivering; means for connecting said product gas output pipe inlet to said means for discharging;

reactant supply means for connecting the inlet of said first reactant gas inlet pipe of said compressor means to said first reactant gas supply source;

product collector means for connecting the outlet of said product gas output pipe of said compressor means to said product gas collector means;

at least one refill means for adding fresh solid reactant at intervals into each of said containing means via said refill end thereof, said interval being the refill interval, said adding of solid reactant being a refill process, each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating, means for sealing said refill end of each of said containing means during compression and expansion processes;

at least one reload means for reloading fresh solid reactant from at least one solid reactant supply source into each of said refill means after each refilling is completed, so that any one said containing means is refilled with solid reactant from the same at least one of said solid reactant supply sources, and so that from each of said number of solid reactant supply sources refilling occurs into at least one of said containing means;

at least one removal means for removing non-gas products from each of said containing means via said removal end thereof, and for sealing said removal end of each of said containing means during said compression and expansion processes, and for dumping said removed products outside the cyclic reactor machine;

sequence means for setting the number of cycles in each sequence of cycles of compression and expansion operative upon said means for initiating said means for discharging and operative upon said means for initiating said means for delivering so that a discharge process followed by a delivery process is carried out at the end of each said sequence of cycles, said sequence means comprising; a cycles counter means for counting cycles, an actuator means operative upon said means for initiating said means for discharging and operative upon said means for initiating said means for delivering so that a discharge process followed by a delivery process is carried out when said cycles counts equal a set value of cycles counts, means for resetting said cycles counter means to start counting cycles again next after each said delivery process is completed with said set value of cycles counts being at least two for at least one sequence;

means for setting said refill interval by setting the number of cycles in each refill interval operative upon said means for initiating said refill drive means of said refill mechanisms so that each said refill means is driven through a single refill process for adding fresh solid reactant into said containing means, at the end of said refill interval.

3. A cyclic reactor plant for contacting at least one solid reactant with at least one gas reactant and comprising at least one cyclic reactor machine, said cyclic reactor machine comprising:

at least one separate solid reactant supply sources;
at least one separate first reactant gas supply sources;
at least two separate product gas collector means;
at least one reaction chambers, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:

means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

a product gas output pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating;

means for discharging gases out of said compressor means into said inlet of said product gas output pipe, such discharge being a discharge process and comprising means for initiating said means for discharging gases so that a single said discharge process is carried out by said means for discharging gases whenever initiated by said means for initiating, and so that each said sequence of cycles is followed by a discharge process and each said discharge process is followed by a delivery process and so that each said delivery process is followed by the next sequence of cycles of compression and expansion;

power means for driving said compressor and for absorbing any power output; means for sealing said discharge means during all compression and expansion processes and essentially all of each delivery process of said compressor means; means for sealing said delivery means during all compression and expansion processes and essentially all of each discharge process of said compressor means, means for connecting said compressor means into said reaction chambers; means for connecting said first reactant gas inlet pipe outlet to said means for delivering, means for connecting said product gas output pipe inlet to said means for discharging;

reactant supply means for connecting the inlet of said first reactant gas inlet pipe of said compressor means to said first reactant gas supply source;

product collector means for connecting the outlet of said product gas output pipe of said compressor means to said product gas collector means;

at least one refill means for adding fresh solid reactant at intervals into each of said containing means via said refill end thereof, said interval being the refill interval, said adding of solid reactant being a refill process, each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating, means for sealing said refill end of each of said containing means during compression and expansion processes;

at least one reload means for reloading fresh solid reactant from at least one solid reactant supply source into each of said refill means after each refilling is completed, so that any one said containing means is refilled with solid reactant from the same at least one of said solid reactant supply sources, and so that from each of said number of solid reactant supply sources refilling occurs into at least one of said containing means;

at least one removal means for removing non-gas products from each of said containing means via said removal end thereof, and for sealing said removal end of each of said containing means during said compression and expansion processes, and for dumping said removed products outside the cyclic reactor machine;

sequence means for setting the number of cycles in each sequence of cycles of compression and expansion operative upon said means for initiating said means for discharging and operative upon said means for initiating said means for delivering so as to carry out a discharge process followed by a delivery process at the end of each said sequence;

said product collector means for connecting comprising;

a discharge group valve comprising; a discharge selector valve with one inlet port and a number of outlet ports equal to the number of said separate product gas collector means, a drive means for driving said discharge selector valve to connect said inlet port to said outlet ports, when initiated, one outlet port at a time in an outlet order of connections to outlet ports and for repeating said outlet order of connections;

means for initiating said drive means for driving said discharge selector valve to change the connection of said inlet port to that outlet port next in said outlet order of connections and for repeating said outlet order of connections, said change of connection to the next outlet port completing one discharge group of sequences, said repeating of one outlet order of connections repeating one batch of discharge groups of sequences;

means for connecting said discharge selector valve inlet port to the outlet of said product gas output pipe of said compressor means; and means for connecting the outlet ports of said discharge selector valve to said product gas collector means so that each outlet port connects to but one product gas collector means;

discharge group means for setting the number of sequences in each said discharge group of sequences operative upon said means for initiating said drive means of said discharge group valve so that said discharge selector valve is driven to connect to the next outlet port in said order of outlet ports at completion of each said discharge group of sequences;

means for setting said refill interval by setting the number of cycles in each refill interval operative upon said means for initiating said refill drive means of said refill mechanisms so that each said refill means is driven through a single refill process for adding fresh solid reactant into said containing means, at the end of said refill interval.

4. A cyclic reactor plant for contacting at least one solid reactant with at least one gas reactant and comprising at least one cyclic reactor machine, said cyclic reactor machine comprising:

at least one separate solid reactant supply sources;

at least two separate and different first reactant gas supply sources;

at least one separate product gas collector means;

at least one reaction chambers, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:

means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

a product gas output pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating;

means for discharging gases out of said compressor means into said inlet of said product gas output pipe, such discharge being a discharge process and comprising means for initiating said means for discharging gases so that a single said discharge process is carried out by said means for discharging gases whenever initiated by said means for initiating, and so that each said sequence of cycles is followed by a discharge process and each said discharge process is followed by a delivery process and so that each said delivery process is followed by the next sequence of cycles of compression and expansion;

power means for driving said compressor and for absorbing any power output; means for sealing said discharge means during all compression and expansion processes and essentially all of each delivery process of said compressor means; means for sealing said delivery means during all compression and expansion processes and essentially all of each discharge process of said compressor means, means for connecting said compressor means into said reaction chambers; means for connecting said first reactant gas inlet pipe outlet to said means for delivering, means for connecting said product gas output pipe inlet to said means for discharging;

reactant supply means for connecting the inlet of said first reactant gas inlet pipe of said compressor means to said first reactant gas supply source;

product collector means for connecting the outlet of said product gas output pipe of said compressor means to said product gas collector means;

at least one refill means for adding fresh solid reactant at intervals into each of said containing means via said refill end thereof, said interval being the refill interval, said adding of solid reactant being a refill process, each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating, means for sealing said refill end of each of said containing means during compression and expansion processes;

at least one reload means for reloading fresh solid reactant from at least one solid reactant supply source into each of said refill means after each refilling is completed, so that any one said containing means is refilled with solid reactant from the same at least one of said solid reactant supply sources, and so that from each of said number of solid reactant supply sources refilling occurs into at least one of said containing means;

at least one removal means for removing non-gas products from each of said containing means via said removal end thereof, and for sealing said removal end of each of said containing means during compression and expansion processes, and for dumping said removed products outside the cyclic reactor machine;

sequence means for setting the number of cycles in each sequence of cycles of compression and expansion operative upon said means for initiating said means for discharging and operative upon said means for initiating said means for delivering so that a discharge process followed by a delivery process is carried out at the end of each said sequence;

said reactant means for connecting comprising:
a delivery group valve comprising; a delivery selector valve with one outlet port and a number of inlet ports equal to the number of said separate and different first reactant gas supply sources, a drive means for driving said delivery selector valve to connect said outlet port to said inlet ports, when initiated, one inlet port at a time in an inlet order of connections to inlet ports and for repeating said inlet order of connections;

means for initiating said drive means for driving said delivery selector valve to change the connection of said outlet port to that inlet port next in said inlet order of connections and for repeating said inlet order of connections, said change of connection to the next inlet port completing one delivery group of sequences, said repeating of one inlet order of connections repeating one batch of delivery groups of sequences;

means for connecting said delivery selector valve outlet port to the inlet of said first reactant gas inlet pipe of said compressor means; and means for connecting the inlet ports of said delivery selector valve to said first reactant gas supply sources so that each inlet port connects to but one first reactant gas supply source;

delivery group means for setting the number of sequences in each said delivery group of sequences operative upon said means for initiating said drive means of said delivery group valve so that said delivery selector valve is driven to connect to the next inlet port in said order of inlet ports at completion of each said delivery group of sequences;

means for setting said refill interval by setting the number of cycles in each refill interval operative upon said means for initiating said refill drive means of said refill mechanisms so that each said refill means is driven through a single refill process for adding fresh solid reactant into said containing means at the end of said refill interval.

5. A cyclic reactor plant for contacting at least one solid reactant with at least one gas reactant and comprising at least one cyclic reactor machine, said cyclic reactor machine comprising:

at least two separate and different solid reactant supply sources;

at least one separate first reactant gas supply sources;

at least one separate product gas collector means;

a number of reaction chambers, at least equal to the number of said separate and different solid reactant supply sources, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:
means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

a product gas output pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating;

means for discharging gases out of said compressor means into said inlet of said product gas output pipe, such discharge being a discharge process and comprising means for initiating said means for discharging gases so that a single said discharge process is carried out by said means for discharging gases whenever initiated by said means for initiating, and so that each said sequence of cycles is followed by a discharge process and each said discharge process is followed by a delivery process and so that each said delivery process is followed by the next sequence of cycles of compression and expansion;

power means for driving said compressor and for absorbing any power output; means for sealing said discharge means during all compression and expansion processes and essentially all of each delivery process of said compressor means; means for sealing said delivery means during all compression and expansion processes and essentially all of each discharge process of said compressor means, means for connecting said compressor means into all of said reaction chambers; means for connecting said first reactant gas inlet pipe outlet to said means for delivering, means for connecting said product gas output pipe inlet to said means for discharging;

reactant supply means for connecting the inlet of said first reactant gas inlet pipe of said compressor means to said first reactant gas supply source;

product collector means for connecting the outlet of said product gas output pipe of said compressor means to said product gas collector means;

a number of separate refill means for adding fresh solid reactant at intervals into each of said containing means via the refill end thereof, said number of separate refill means equalling said number of separate and different solid reactant supply sources, said interval being the refill interval, said adding of solid reactant being a refill process;

means for connecting said separate refill means to said separate containing means during refilling so that each said separate containing means of said number of separate reaction chambers is refilled by but one of said separate refill means;

each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating;

means for sealing said refill end of each of said containing means during compression and expansion processes;

a number of separate reload means for reloading fresh solid reactant from said solid reactant supply sources into said refill means after each refilling is completed, said number of reload means being equal to said number of separate refill means;

means for connecting said separate reload means to said separate refill means during reloading so that each said separate refill means is reloaded by but one of said separate reload means;

means for connecting said separate reload means to said separate solid reactant supply sources so that each said separate reload means receives fresh solid reactant from but one of said separate solid reactant supply sources;

at least one removal means for removing non-gas products from each of said containing means via said removal end thereof, and for sealing said removal end of each of said containing means during compression and expansion processes, and for dumping said removed products outside the cyclic reactor machine;

sequence means for setting the number of cycles in each sequence of cycles of compression and expansion operative upon said means for initiating said means for discharging and operative upon said means for initiating said means for delivering so that a discharge process followed by a delivery process is carried out at the end of each said sequence;

means for setting said refill interval of each said refill means by setting the number of cycles in each refill interval operative upon said means for initiating each said drive means of each said refill mechanism so that each said refill means is driven through a single refill process for adding fresh solid reactant into said connected containing means at the end of its refill interval.

6. A cyclic reactor plant for contacting at least one solid reactant with at least one gas reactant and comprising at least one cyclic reactor machine, said cyclic reactor machine comprising:

at least one separate solid reactant supply sources;
at least one separate first reactant gas supply sources;
at least one separate product gas collector means;
at least one reaction chambers, each said reaction chamber comprising, containing means for containing solid reactants so that gases may be compressed into contact with said solid reactants and so that gases may be expanded away from said solid reactants, each said containing means comprising a refill end and a removal end, said containing means further functioning so that fresh solid reactant can be added into said containing means via said refill end and so that non-gaseous products can be removed from said containing means via said removal end, and so that solid reactants and non-gaseous products are elsewhere contained within said containing means;

a compressor means comprising:
means for compressing gases into said reaction chambers and means for expanding gases out of these same reaction chambers so that each compression process is followed by a single expansion process and these two steps together constitute a single cycle of compression and expansion, and so that said cycles of compression and expansion follow one another in succession in a sequence of a number of cycles, and so that said number of cycles in each sequence of cycles is at least one;

a first reactant gas inlet pipe comprising an inlet and an outlet;

a product gas output pipe comprising an inlet and an outlet;

means for delivering gases into said compressor means from said outlet of said first reactant gas inlet pipe, such delivery being a delivery process, and comprising means for initiating said means for delivering gases so that a single said delivery process is carried out by said means for delivering gases whenever initiated by said means for initiating;

means for discharging gases out of said compressor means into said inlet of said product gas output pipe, such discharge being a discharge process and comprising means for initiating said means for discharging gases so that a single said discharge process is carried out by said means for discharging gases whenever initiated by said means for initiating, and so that each said sequence of cycles is followed by a discharge process and each said discharge process is followed by a delivery process and so that each said delivery process is followed by the next sequence of cycles of compression and expansion;

power means for driving said compressor and for absorbing any power output; means for sealing said discharge means during all compression and expansion processes and essentially all of each delivery process of said compressor means; means for sealing said delivery means during all compression and expansion processes and essentially all of each discharge process of said compressor means, means for connecting said compressor means into said reaction chambers; means for connecting said first reactant gas inlet pipe at outlet to said means for delivering; means for connecting said product gas output pipe inlet to said means for discharging;

reactant supply means for connecting the inlet of said first reactant gas inlet pipe of said compressor means to said first reactant gas supply source;

product collector means for connecting the outlet of said product gas output pipe of said compressor means to said product gas collector means;

at least one refill means for adding fresh solid reactant at intervals into each of said containing means via said refill end thereof, said interval being the refill interval, said adding of solid reactant being a refill process, each said refill means comprising, a refill mechanism means for adding fresh solid reactant into said containing means, refill drive means for driving said refill mechanism through a refill process, means for initiating said refill drive means to drive said refill mechanism through a refill process so that a single said refill process is carried out by said refill mechanism whenever said refill drive means is initiated by said means for initiating, means for sealing said refill end of each of said containing means during compression and expansion processes;

at least one reload means for reloading fresh solid reactant from at least one solid reactant supply source into each of said refill means after each refilling is completed, so that any one said containing means is refilled with solid reactant from the same at least one of said solid reactant supply sources, and so that from each of said number of solid reactant supply sources refilling occurs into at least one of said containing means;

sequence means for setting the number of cycles in each sequence of cycles of compression and expansion operative upon said means for initiating said means for discharging and operative upon said means for initiating said means for delivering so that a discharge process followed by a delivery process is carried out at the end of each said sequence of cycles, said sequence means comprising; a cycles counter means for counting cycles, an actuator means operative upon said means for initiating said means for discharging and operative upon said means for initiating said means for delivering so that a discharge process followed by a delivery process is carried out when said cycles counts equal a set value of cycles counts, means for resetting said cycles counter means to start counting cycles again next after each said delivery process is completed with said set value of cycles counts being at least two for at least one sequence;

means for setting said refill interval by setting the number of cycles in each refill interval operative upon said means for initiating said refill drive means of said refill mechanisms so that each said refill means is driven through a single refill process for adding fresh solid reactant into said containing means at the end of said refill interval.

7. A cyclic reactor plant for contacting at least one solid reactant with at least one gas reactant and comprising at least one cyclic reactor machine as described in claim 4:

wherein there are at least two separate product gas collector means;

wherein said product collector means for connecting comprises:

a discharge group valve comprising; a discharge selector valve with one inlet port and a number of outlet ports equal to the number of said separate product gas collector means, a drive means for driving said discharge selector valve to connect said inlet port to said outlet ports, when initiated, one outlet port at a time in an outlet order of connections to outlet ports and for repeating said outlet order of connections;

means for initiating said drive means for driving said discharge selector valve to change the connection of said inlet port to that outlet port next in said outlet order of connections and for repeating said outlet order of connections, said change of connection to the next outlet port completing one discharge group of sequences, said repeating of one outlet order of connections repeating one batch of discharge groups of sequences;

and means for connecting said discharge selector valve inlet port to the outlet of said product gas output pipe of said compressor means;

and means for connecting the outlet ports of said discharge selector valve to said product gas collector means so that each outlet port connects to but one product gas collector means;

discharge group means for setting the number of sequences in each said discharge group of sequences operative upon said means for initiating said drive means of said discharge group valve so that said discharge selector valve is driven to connect to the next outlet port in said order of outlet ports at completion of each said discharge group of sequences.

8. A cyclic reactor plant for contacting at least one solid reactant with at least one gas reactant and comprising at least one cyclic reactor machine as described in claim 7:

and further comprising means for timing said delivery group means for setting the number of sequences relative to said discharge group means for setting the number of sequences so that said compressor means starts a batch of delivery sequences concurrently with starting a batch of discharge sequences, and ends a batch of delivery sequences concurrently with ending a batch of discharge sequences.

9. A cyclic reactor plant for contacting at least one solid reactant with at least one gas reactant and comprising a number of cyclic reactor machines as described in claim 8:

wherein said cyclic reactor plant comprises a number of said cyclic reactor machines equal to an integer other than zero multiplied by the least number of compressor means for steady product formation which least number equals the total number of compression expansion cycles in a delivery batch of groups of sequences of cycles plus the number of cycles utilized for discharge and delivery processes during one batch;

and further wherein said cyclic reactor plant comprises:

relative timing means for timing said number of compressor means, said delivery group valves, said discharge group valves, and said delivery group means for setting the number of sequences and said discharge group means for setting the number of sequences of each said compressor means, relative to each other so that, the number of compressor means, whose first reactant gas inlet pipes are connected via their connected delivery selector valve inlet ports to each differing first reactant gas supply source, remains constant, and so that the inlet order of connections to inlet ports is the same for all of said delivery group valves, and so that each compressor means follows the same pattern of sequences lengths for each delivery batch of groups of sequences, and so that the outlet order of connections to outlet ports is the same for all of said discharge group valves, and so that the number of compressor means whose product gas output pipes are connected via their connected discharge selector valve outlet ports, to each differing product gas collector means, remains constant, and so that each compressor means follows the same pattern of sequences lengths for each discharge batch of groups of sequences;

a number of said refill means at least equal to the number of separate reaction chambers connected to each said compressor means;

a number of said reload means at least equal to the number of separate reaction chambers connected to each said compressor means;

at least one of said removal means;

and further wherein said several power means of each of said number of compressor means are combined into a common power means.

10. A cyclic reactor plant for contacting at least one solid reactant with at least one gas reactant and comprising a number of cyclic reactor machines as described in claim 4:

wherein said cyclic reactor plant comprises a number of said cyclic reactor machines equal to an integer other than zero multiplied by the least number of compressor means for steady product formation which least number equals the total number of compression expansion cycles in a delivery batch of groups of sequences of cycles plus the number of cycles utilized for discharge and delivery processes during one batch;

and further wherein said cyclic reactor plant comprises:

relative timing means for timing said number of compressor means, said delivery group valves, and said delivery group means for setting the number of sequences of each said compressor means, relative to each other so that, the number of compressor means, whose first reactant gas inlet pipes are connected via their connected delivery selector valve inlet ports to each differing first reactant gas supply source, remains constant, and so that the inlet order of connections to inlet ports is the same for all of said delivery group valves, and so that each compressor means follows the same pattern of sequences lengths for each delivery batch of groups of sequences;

a number of said refill means at least equal to the number of separate reaction chambers connected to each said compressor means;

a number of said reload means at least equal to the number of separate reaction chambers connected to each said compressor means;

at least one of said removal means;

and further wherein said several power means of each of said number of compressor means are combined into a common power means.

11. A cyclic reactor plant for contacting at least one solid reactant with at least one gas reactant and comprising at least one cyclic reactor machine as described in claim 5, and further comprising:

wherein there are at least two separate and different first reactant gas supply sources;

wherein said reactant supply means for connecting comprises:

a delivery group valve comprising; a delivery selector valve with one outlet port and a number of inlet ports equal to the number of said separate and different first reactant gas supply sources, a drive means for driving said delivery selector valve to connect said outlet port to said inlet ports, when initiated, one inlet port at a time in an inlet order of connections to inlet ports and for repeating said inlet order of connections;

means for initiating said drive means for driving said delivery selector valve to change the connection of said outlet port to that inlet port next in said inlet order of connections and for repeating said inlet order of connections, said change of connection to the next inlet port completing one delivery group of sequences, said repeating of one inlet order of connections repeating one batch of delivery groups of sequences;

means for connecting said delivery selector valve outlet port to the inlet of said first reactant gas inlet pipe of said compressor means; and means for connecting the inlet ports of said delivery selector valve to said first reactant gas supply sources so that each inlet port connects to but one first reactant gas supply source;

delivery group means for setting the number of sequences in each said delivery group of sequences operative upon said means for initiating said drive means of said delivery group valve so that said delivery selector valve is driven to connect to the next inlet port in said order of inlet ports at completion of each said delivery group of sequences.

12. A cyclic reactor plant for contacting at least one solid reactant with at least one gas reactant and comprising at least one cyclic reactor machine as described in claim 11, and further comprising:
wherein there are at least two separate product gas collector means;
wherein said product collector means for connecting comprises:
a discharge group valve comprising; a discharge selector valve with one inlet port and a number of outlet ports equal to the number of said separate product gas collector means, a drive means for driving said discharge selector valve to connect said inlet port to said outlet ports, when initiated, one outlet port at a time in an outlet order of connections to outlet ports and for repeating said outlet order of connections;
means for initiating said drive means for driving said discharge selector valve to change the connection of said inlet port to that outlet port next in said outlet order of connections and for repeating said outlet order of connections, said change of connection to the next outlet port completing one discharge group of sequences, said repeating of one outlet order of connections repeating one batch of discharge groups of sequences;
means for connecting said discharge selector valve inlet port to the outlet of said product gas output pipe of said compressor means; and means for connecting the outlet ports of said discharge selector valve to said product gas collector means so that each outlet port connects to but one product gas collector means;
discharge group means for setting the number of sequences in each said discharge group of sequences operative upon said means for initiating said drive means of said discharge group valve so that said discharge selector valve is driven to connect to the next outlet port in said order of outlet ports at completion of each said discharge group of sequences.

13. A cyclic reactor plant for contacting at least one solid reactant with at least one gas reactant and comprising at least one cycle reactor machine as described in claim 12, and further comprising:
means for timing said delivery group means for setting the number of sequences relative to said discharge group means for setting the number of sequences so that said compressor means starts a batch of delivery sequences concurrently with starting a batch of discharge sequences, and ends a batch of delivery sequences concurrently with ending a batch of discharge sequences.

14. A cyclic reactor plant for contacting at least one solid reactant with at least one gas reactant and comprising a number of cyclic reactor machines as described in claim 13:
wherein said cyclic reactor plant comprises a number of said cyclic reactor machines equal to an integer other than zero multiplied by the least number of compressor means for steady product formation which least number equals the total number of compressor expansion cycles in a delivery batch of groups of sequences of cycles, plus the number of cycles utilized for discharge and delivery processes during one batch;
and further wherein said cyclic reactor plant comprises:
relative timing means for timing said number of compressor means, said delivery group valves, said discharge group valves, and said delivery group means for setting the number of sequences and said discharge group means for setting the number of sequences of each said compressor means, relative to each other so that, the number of compressor means, whose first reactant gas inlet pipes are connected via their connected delivery selector valve inlet ports to each differing first reactant gas supply source, remains constant, and so that the inlet order of connections to inlet ports is the same for all of said delivery group valves, and so that each compressor means follows the same pattern of sequences lengths for each delivery batch of groups of sequences, and so that the outlet order of connections to outlet ports is the same for all of said discharge group valves, and so that the number of compressor means whose product gas output pipes are connected via their connected discharge selector valve outlet ports, to each differing product gas collector means, remains constant, and so that each compressor means follows the same pattern of sequences lengths for each discharge batch of groups of sequences;
a number of said refill means at least equal to the number of separate reaction chambers connected to each said compressor means;
a number of said reload means at least equal to the number of separate reaction chambers connected to each said compressor means;
at least one of said removal means;
and further wherein said several power means of each of said number of compressor means are combined into a common power means.

15. A cyclic reactor plant for contacting at least one solid reactant with at least one gas reactant and comprising a number of cyclic reactor machines as described in claim 11:
wherein said cyclic reactor plant comprises a number of said cyclic reactor machines equal to an integer other than zero multiplied by the least number of compressor means for steady product formation which least number equals the total number of compression expansion cycles in a delivery batch of groups of sequences of cycles, plus the number of cycles utilized for discharge and delivery processes during one batch;
and further wherein said cyclic reactor plant comprises:
relative timing means for timing said number of compressor means, said delivery group valves, and said delivery group means for setting the number of sequences of each said compressor means, relative to each other so that, the number of compressor means whose first reactant gas inlet pipes are connected via their connected delivery selector valve inlet ports to each differing first reactant gas supply source, remains constant, and so that the inlet order of connections to inlet ports is the same for all of said delivery group valves, and so that each compressor means follows the same pattern of sequences lengths for each delivery batch of groups of sequences;

a number of said refill means at least equal to the nunber of separate reaction chambers connected to each said compressor means;

a number of said reload means at least equal to the number of separate reaction chambers connected to each said compressor means;

at least one of said removal means;

and further wherein said several power means of each of said number of compressor means are combined into a common power means.

16. A cyclic reactor plant for contacting at least one solid reactant with at least one gas reactant and comprising at least one cyclic reactor machine as described in claim 5, and further comprising:

wherein there are at least two separate product gas collector means;

wherein said product collector means for connecting comprises:

a discharge group valve comprising; a discharge selector valve with one inlet port and a number of outlet ports equal to the number of said separate product gas collector means, a drive means for driving said discharge selector valve to connect said inlet port to said outlet ports, when initiated, one outlet port at a time in an outlet order of connections to outlet ports and for repeating said outlet order of connections;

means for initiating said drive means for driving said discharge selector valve to change the connection of said inlet port to that outlet port next in said outlet order of connections and for repeating said outlet order of connections, said change of connection to the next outlet port completing one discharge group of sequences, said repeating of one outlet order of connections repeating one batch of discharge groups of sequences;

means for connecting said discharge selector valve inlet port to the outlet of said product gas output pipe of said compressor means; and means for connecting the outlet ports of said discharge selector valve to said product gas collector means so that each outlet port connects to but one product gas collector means;

discharge group means for setting the number of sequences in each said discharge group of sequences operative upon said means for initiating said drive means of said discharge group valve so that said discharge selector valve is driven to connect to the next outlet port in said order of outlet ports at completion of each said discharge group of sequences.

17. A cyclic reactor plant for contacting at least one solid reactant with at least one gas reactant and comprising a number of cyclic reactor machines as described in claim 3:

wherein said cyclic reactor plant comprises a number of said cyclic reactor machines equal to an integer other than zero multiplied by the least number of compressor means for steady product output which least number equals the total number of compression expansion cycles in a discharge batch of groups of sequences of cycles, plus the number of cycles utilized for discharge and delivery processes during one batch;

and further wherein said cyclic reactor plant comprises:

relative timing means for timing said number of compressor means, said discharge group valves, and said discharge group means for setting the number of sequences of each said compressor means, relative to each other so that, the number of compressor means, whose product gas output pipes are connected via their connected discharge selector valve outlet ports to each differing product gas collector means, remains constant, and so that the outlet order of connections to outlet ports is the same for all of said discharge group valves;

a number of said refill means at least equal to the number of separate reaction chambers connected to each said compressor means;

a number of said reload means at least equal to the number of separate reaction chambers connected to each said compressor means;

at least one of said removal means;

and further wherein said several power means of each of said number of compressor means are combined into a common power means.

18. A cyclic reactor plant for contacting at least one solid reactant with at least one gas reactant and comprising a number of cyclic reactor machines as described in claim 16:

wherein said cyclic reactor plant comprises a number of said cyclic reactor machines equal to an integer other than zero multiplied by the least number of compressor means for steady product output which least number equals the total number of compression expansion cycles in a discharge batch of groups of sequences of cycles, plus the number of cycles utilized for discharge and delivery processes during one batch;

and further wherein said cyclic reactor plant comprises:

relative timing means for timing said number of compressor means, said discharge group valves, and said discharge group means for setting the number of sequences of each said compressor means, relative to each other so that, the number of compressor means, whose product gas output pipes are connected via their connected discharge selector valve outlet ports to each differing product gas collector means, remains constant, and so that the outlet order of connections to outlet ports is the same for all of said discharge group valves;

a number of said refill means at least equal to the number of separate reaction chambers connected to each said compressor means;

a number of said reload means at least equal to the number of separate reaction chambers connected to each said compressor means;

at least one of said removal means;

and further wherein said several power means of each of said number of compressor means are combined into a common power means.

19. A cyclic reactor plant for contacting at least one solid reactant with at least one gas reactant and comprising at least one cyclic reactor machine as described in claim 1, 2, 3, 4, 5, 6, 7, 11, 12, or 16; and further comprising:

at least one additional separate reactant gas supply pipe;

admission means for admitting reactant gas separately from each of said additional reactant gas supply pipes into said compressor means at least once during at least one selected cycle of at least one selected sequence during each refill interval, so that each said admission commences after the start of that first compression process and ends prior to the end of that last expansion process of each sequence during which said admission occurs;

cycle quantity control means for controlling the quantity of each additional reactant gas admitted by said admission means during each admission cycle.

20. A cyclic reactor plant for contacting at least one solid reactant with at least one gas reactant and comprising at least one cyclic reactor machine as described in claim 9, 10, 14, 15, 17, or 18, and further comprising:

at least one additional separate reactant gas supply pipe;

wherein each said cyclic reactor machine of said cyclic reactor plant comprises;

admission means for admitting reactant gas separately from each of said additional reactant gas supply pipes into said compressor means at least once during at least one selected cycle of at least one selected sequence during each batch of groups of sequences of cycles of each compressor means, so that each said admission commences after the start of that first compression process and ends prior to the end of that last expansion process of each sequence during which said admission occurs;

cycle quantity control means for controlling the quantity of each additional reactant gas admitted by said admission means during each admission cycle.

21. A cyclic reactor plant for contacting at least one solid reactant with at least one gas reactant and comprising at least one cyclic reactor machine as described in claim 1, 2, 3, 4, 5, 6, 7, 11, 12, or 16, wherein said sequence means for setting the number of cycles in each sequence of cycles can set differing numbers of cycles in successive sequences in a pattern of sequences lengths, and so that said pattern of sequences lengths is repeated at least for each refill interval.

22. A cyclic reactor plant for contacting at least one solid reactant with at least one gas reactant and comprising at least one cyclic reactor machine as described in claim 3, 4, 7, 11, 12, or 16, and further comprising:

means for changing the number of sequences in each delivery group of sequences as between successive groups of sequences.

23. A cyclic reactor plant for contacting at least one solid reactant with at least one gas reactant and comprising at least one cyclic reactor machine as described in claim 5, 11, 12, or 16, wherein said removal means comprises:

a number of separate removal means for removing non-gas products separately from each of said containing means via the removal end thereof, said number of removal means equalling said number of separate reaction chambers;

means for connecting said separate removal means to said separate containing means during removal so that each said separate containing means of said number of separate reaction chambers has non-gas products removed by but one of said separate removal means.

24. A cyclic reactor plant for contacting at least one solid reactant with at least one gas reactant and comprising at least one cyclic reactor machine as described in claim 1, 2, 3, 4, 5, 6, 7, 11, 12, or 16, wherein;

at least one of said removal means comprises; means for removing a quantity of non-gas products from at least one of said containing means in the liquid state and for dumping said removed liquid products outside the cyclic reactor machine, sealing means for sealing said removal end of said containing means during compression and expansion processes.

25. A cyclic reactor plant for contacting at least one solid reactant with at least one gas reactant and comprising at least one cyclic reactor machine as described in claim 1, 2, 3, 4, 5, 6, 7, 11, 12, or 16:

wherein each said removal means comprises; a removal mechanism means for removing a quantity of non-gas products at intervals from said containing means and for dumping said removed products outside the cyclic reactor machine, said interval being the removal interval, said removal of non-gaseous products being a removal process, sealing means for sealing said removal end of said containing means during compression and expansion processes, removal drive means for driving said removal mechanism through a removal process when initiated at the end of each removal interval, means for initiating said removal drive means to drive said removal mechanism through a removal process so that a single removal process is carried out by said removal mechanism whenever said removal drive means is initiated by said means for initiating;

and further comprising:

means for setting said removal interval by setting the number of cycles in each removal interval operative upon said means for initiating said removal drive means of said removal mechanisms so that each said removal mechanism is driven through a single removal process to remove non-gas products from said containing means, at the end of each said removal interval.

26. A cyclic reactor plant for contacting at least one solid reactant with at least one gas reactant and comprising at least one cyclic reactor machine as described in claim 5, 11, 12 or 16, wherein said removal comprises;

a number of separate removal means for removing non-gas products separately from each of said containing means via the removal end thereof, said number of removal means equalling said number of separate reaction chambers;

means for connecting said separate removal means to said separate containing means during removal so that each said separate containing means of said number of separate reaction chambers has non-gas products removed by but one of said separate removal means;

each said removal means comprising, a removal mechanism means for removing non-gas products from said connected containing means and for dumping said removed products outside the cyclic reactor machine, said interval being the removal interval, said removal of non-gaseous products being a removal process, means for sealing said removal end of said connected containing means during compression and expansion processes, removal drive means for driving said removal mechanism at intervals through a removal process when initiated at the end of each removal interval, means for initiating said removal drive means to drive said removal mechanism through a removal process so thaat a single removal process is carried out by said removal mechanism whenever said removal drive means is initiated by said means for initiating;

means for setting said removal interval of each said removal means by setting the number of cycles in each removal interval operative upon said means for initiating each said drive means of each said removal mechanism so that each said removal means is driven through a single removal process for removing non-gas products from said connected containing means at the end of each said removal interval.

27. A cyclic reactor plant for contacting at least one solid reactant with at least one gas reactant and comprising at least one cyclic reactor machine as described in claim 5, 11, 12, or 16, wherein at least one of said separate reaction chambers is enclosed inside another one of said separate reaction chambers for each of said compressor means.

28. A cyclic reactor plant for contacting at least one solid reactant with at least one gas reactant and comprising at least one cyclic reactor machine as described in claim 5, 11, 12, or 16, wherein said means for setting refill interval comprises:

a number of separate means for setting said refill interval of each said refill means by setting the number of cycles in each refill interval operative upon each said means for initiating each said drive means of each said refill mechanism to drive said refill means through a single refill process for adding fresh solid reactant into said connected containing means, said number of separate means for setting refill interval being equal to said number of separate refill means;

means for connecting said separate means for setting refill interval to said drive means of said refill means so that each said separate refill drive means is initiated by but one of said separate means for setting refill interval;

wherein said refill interval can differ between said several separate refill means.

* * * * *

UNITED STATES PATENT AND TRADEMARK OFFICE
CERTIFICATE OF CORRECTION

PATENT NO. : 4,584,970
DATED : 29 April 1986
INVENTOR(S) : Joseph C. Firey

It is certified that error appears in the above-identified patent and that said Letters Patent is hereby corrected as shown below:

```
Col.  2 line 17:  change, "spaced," to, -- spaces --.
Col.  3 line  7:  change, "one," to, -- once --.
Col.  3 line 19:  change, "reactor," to, -- reactant --.
Col. 18 line 20:  change, "12," to, -- 142 --.
Col. 18 line 59:  change, "ar," to, -- are --.
Col. 19 line  6:  insert, - may be --, between the words
                  products and of.
Col. 22 line  2:  change, "rthe," to, -- the --.
Col. 24 line 20:  change, "fthe," to, -- the --.
Col. 32 line  3:  change, "WFG/WFG," to, -- WGP/WFG --.
Col. 57 line  2:  change, "thaat," to, -- that --.
```

Signed and Sealed this

Twenty-sixth Day of August 1986

[SEAL]

Attest:

DONALD J. QUIGG

Attesting Officer

Commissioner of Patents and Trademarks